United States Patent [19]
Frankel

[11] Patent Number: 6,070,151
[45] Date of Patent: May 30, 2000

[54] SYSTEM FOR THE CREATION AND COLLATERALIZATION OF REAL ESTATE MORTGAGE INVESTMENT CONDUIT SECURITIES

[75] Inventor: Judah M. Frankel, Brooklyn, N.Y.

[73] Assignee: Fibonacci Corporation, Brooklyn, N.Y.

[21] Appl. No.: 08/563,856

[22] Filed: Nov. 29, 1995

Related U.S. Application Data

[63] Continuation of application No. 08/052,245, Apr. 22, 1993, abandoned.

[51] Int. Cl.[7] .................................................. G06F 157/00
[52] U.S. Cl. ............................................... 705/35; 705/36
[58] Field of Search ..................................... 364/400, 401, 364/406, 408; 705/35, 36; 235/379; 283/56, 57; 340/825.26

[56] References Cited

U.S. PATENT DOCUMENTS

| | | |
|---|---|---|
| 4,346,442 | 8/1982 | Musmanno . |
| 4,642,768 | 2/1987 | Roberts . |
| 4,674,044 | 6/1987 | Kalmus et al. . |
| 4,722,055 | 1/1988 | Roberts . |
| 4,739,478 | 4/1988 | Roberts et al. . |
| 4,750,121 | 6/1988 | Halley et al. . |
| 4,751,640 | 6/1988 | Lucas et al. . |
| 4,839,804 | 6/1989 | Roberts et al. . |
| 4,876,648 | 10/1989 | Lloyd ........................................ 364/408 |
| 4,910,676 | 3/1990 | Alldredge . |
| 4,953,085 | 8/1990 | Atkins . |
| 5,083,270 | 1/1992 | Gross et al. ............................. 364/408 |
| 5,227,967 | 7/1993 | Bailey ...................................... 364/408 |
| 5,237,500 | 8/1993 | Perg et al. ............................... 364/408 |

OTHER PUBLICATIONS

Anand K. Bhattacharya, "Synthetic Mortgage–Backed Securities", Journal of Portfolio Management, v18, n3, pp. 44–54, Spring, 1992.

90 TNT 17–44, Treasury Tax Correspondence, Jan. 22, 1990.

Golant, "Patents For Financial Products", *New York Law Journal*, Dec. 10, 1989.

*Primary Examiner*—Frantzy Poinvil
*Attorney, Agent, or Firm*—Morgan & Finnegan, LLP

[57] ABSTRACT

A system for creating and managing securities that evaluates the cash flows of mortgage securities that are to be restructured into new securities. The securities to be restructured can be either mortgage securities that qualify as collateral for a CMO/REMIC or securities that were issued by an existing CMO/REMIC. Based upon the original mortgage securities, the system may create four new securities: two each that have principal-only cash flows and two each that have interest-only cash flows.

38 Claims, 10 Drawing Sheets

SYSTEM FOR THE CREATION AND COLLATERALIZATION OF REAL ESTATE MORTGAGE INVESTMENT CONDUIT SECURITIES

CROSS-REFERENCE TO RELATED APPLICATIONS

This application is a continuation of U.S. patent application Ser. No. 08/052,245, filed Apr. 22, 1993, now abandoned.

BACKGROUND OF THE INVENTION

This invention relates to systems for creating and managing securities. More particularly, this invention relates to systems for creating and managing securities that are collateralized by mortgage obligations.

The mortgage securities industry is the largest financial business in the United States and consists primarily of products related to mortgage loans on residential and commercial properties. The great majority of residential mortgage loans are extended to individuals for the purpose of financing their primary or secondary place of residence. Mortgages are loans with a principal amount that is usually scheduled to be gradually paid-off over an extended period of time, such as 15 or 30 years. The mortgage loan carries an interest rate that is periodically (usually monthly) applied to the remaining principal balance of the loan. The "scheduled" periodic payment usually consists of the interest owed on the outstanding balance for the previous period plus some amount of principal which reduces the outstanding balance of the loan.

A characteristic of the current mortgage industry is that most of the money for residential mortgages is ultimately provided by institutional investors—not by the banks or mortgage bankers who usually arrange the mortgages for homeowners. Once a group of mortgages with similar terms has been arranged, they will often be packaged into a single unit called a mortgage pool and sold to institutional investors. Most residential mortgage loans issued in recent years have ended up as components in large mortgage pools that were ultimately resold to institutional investors or to investment bankers that repackage them into other forms of mortgage-backed securities.

For example, a mortgage lender may collect several million dollars of 30-year mortgage loans that it originates and place them into one package. Whereas the individual mortgages may carry interest rates of 8.85% to 9.30%, the interest rate on the package will usually be a single fixed rate such as 8.50%. The difference between the interest paid on underlying loans (the "gross coupon rates") and the interest rate paid on the package (the "pool rate" or the "net coupon rate") is usually retained by the original mortgage lender as a fee for arranging the mortgage and for continuing to service it (i.e., collect payments, perform bookkeeping, etc.).

Currently, the great majority of mortgage loans and mortgage pools are repackaged and restructured before they are ultimately sold to investors. The most common device for this is the collateralized mortgage obligation ("CMO"). The procedure for creating a CMO is as follows:

(1) An issuer/underwriter purchases a large amount of mortgages or mortgage pools—usually $250 to $500 million in value. This is the collateral for the CMO.

(2) The collateral is deposited with a trustee who will thereafter receive the payments generated by the collateral and who will arrange payments to be made on new securities to be issued.

(3) The issuer/underwriter issues securities whose payments of principal and/or interest are collateralized by the payments of principal and interest that will be generated by the collateral. These securities are structured so that there will always be sufficient cash flow from the collateral (i.e., the mortgages) to fulfill the stated obligations of the newly issued CMO securities. The new securities are called CMO tranches, CMO bonds, or CMO classes.

Most CMOs are subject to real estate mortgage investment conduit ("REMIC") legislation designed to apply to various mortgage-related securities. Such CMOs are often simply referred to as REMICs. REMIC legislation and regulations provide for various tax, structural and other regulatory rules and regulations that govern the origination and structure of CMO/REMICs. The regulations govern what securities qualify as collateral for a CMO/REMIC as well as what securities may be issued by the REMIC.

The conventional securities that may be issued by a REMIC subject to the various REMIC restrictions are called "regular interests." It is these securities that are of greatest interest to the vast majority of investors. An important property of a regular interest is that any regular interest issued by a REMIC qualifies to be utilized as collateral for another REMIC. Each REMIC may issue any number of regular interests. In addition, each REMIC must issue one "residual interest" which receives whatever cash flow remains after the regular interests are paid.

At times the issuance of a desired regular interest security may be achievable only by utilizing several REMICS. In such a procedure the initial collateral from which the desired security is to be derived is placed into a REMIC which issues one or more regular interests. Some of these regular interests then serve as the collateral for another REMIC which issues other regular interests. This may be done several times until the desired regular interest security can be issued. When the creation of these several REMICS is done simultaneously, the procedure is referred to as a multistage REMIC.

At times, the REMIC regulations limit the ability to design and structure securities that would otherwise be attractive to certain investors. These restrictions are most restrictive in governing the amount and formulas for interest that may be paid on REMIC securities. These restrictions often prevent the creation of securities whose performance characteristics would make them most suitable as hedging vehicles for clients that own assets that could be significantly impacted by large or sudden movements in interest rates or mortgage prepayments.

In particular, the current and proposed REMIC regulations regulate what type of interest rates may be paid by a regular REMIC interest. For example, a regular interest may pay interest at a rate equal to: 1) a fixed rate of interest—e.g., 7.0%, 2) a recognized interest rate index or a multiple thereof plus or minus a fixed rate of interest—(e.g., 2 times the T-bill rate+1.50%), or 3) interest equal a fixed portion of the total interest on the collateral. An interest formula that is not directly provided for under the REMIC regulations is the payment of a variable percentage of the total interest on the collateral (e.g., the interest paid equals 25% of the total interest paid on the collateral if the T-bill rate is 5.0% or below, and equals 75% if the T-bill rate is above 5.0%).

Three popular securities that are often created within a CMO/REMIC are 1) principal-only ("PO") bonds which pay no interest and are therefore sold at a discount to their par amount (i.e., at less than the principal amount), 2) interest only ("IO") and similar bonds that pay little or no principal amount but are expected to pay a substantial amount of interest (relative to the principal amount if any), and 3) variable rate bonds that have an interest rate that varies with changes in some interest rate index. In general, the performance of these types of securities can be very volatile and the returns to investors in these securities may vary substantially depending on future interest rate levels and the rate at which the underlying mortgage loans are paid off by their homeowners. Nevertheless, these securities are attractive and useful to a variety of investors that utilize them to hedge their assets against interest rate risks or to achieve other performance objectives.

There are several drawbacks to these securities, however. Two of the drawbacks are that 1) the performance of these securities can be significantly affected in unanticipated fashion if the underlying mortgage loans are prepaid at either a faster or slower rate than expected, and 2) many potential institutional investors are prohibited from purchasing IO-type securities that have relatively little or no principal amount, because the investor is not promised even the return of the original investment.

Accordingly, there exists a need for a system to provide an investment vehicle whose performance is more predictable and controllable than conventional principal-only and interest-only securities. Further, there exists a need to meet investor objectives within current REMIC regulations.

SUMMARY OF THE INVENTION

With the foregoing in mind, it is an objective of the invention to provide a system to create securities that provide the performance of Principal-Only and Interest-Only type securities but which avoid some of the major problems associated with these securities.

It is a further object of the invention to provide a system to create investments that can be tailored to achieve investor objectives with greater precision than is currently possible.

It is a further objective of the invention to provide a system to create securities that achieve a wider range of performance than was previously available.

These and other objectives of the invention are met by providing a system for creating and managing securities that evaluates the cash flows of underlying securities collateralized by mortgage obligations (the "collateral") that are to be restructured into new securities. The underlying securities to be restructured can be either mortgage securities that qualify ad collateral for a CMO/REMIC or securities that were issued by an existing CMO/REMIC. The system determines the cash flows based on the Original Term of the underlying securities, as well as the Remaining Term and Loan Age, Gross Coupon, Net Coupon, Settlement Date, Issue Date, Payment Dates, Present Value, and various other mortgage loan characteristics.

When a particular bond of a CMO is to be considered, the pertinent parameters that describe how the bond is derived from the underlying securities and that determine the timing and amount of its cash flows are analyzed. The system then determines the timing and amount of both principal and interest payments that would be produced under a variety of potential prepayment and interest rate scenarios input to the system. The system determines the market value of the principal payment cash flows and the interest payment cash flows and compares their sum to the cost of the combined cash flows.

The system may then create four new securities: two each that have Principal Only cash flows ("PROs") and two that have Interest Only cash flows ("IOs"). The system utilizes user-provided input to determine how the principal payments generated by the underlying securities will be allocated between the PRO securities and how the interest payments will be divided between the IO securities. The system projects the cash flows for each of these four securities under a variety of interest rate and mortgage prepayment scenarios. These cash flows may be analyzed and a market value placed on each and their total market value compared to the cost of the underlying securities. The system repeats this procedure in automated fashion or under user control by altering the proposed method for allocating principal and interest between the PROs and IOs. The adjusted cash flows and market values of the PROs and IOs are determined and compared to the previous values. This iterative procedure may be repeated until a cash flow allocation procedure that results in the most marketable PRO and IO securities is determined.

The system may also analyze the properties and market value of combinations of the PROs and IOs. The system accepts any user-defined combination of the PROs and IOs and creates the cash flows of the proposed combination security. The system then projects the cash flows under any set of interest rate and prepayment rate scenarios, and analyzes its performance if the component prices are given. Alternatively, the system may determine the market value of the combination security if its performance levels are specified.

After the characteristics of the PROs and IOs to be issued have been determined, the system creates a multistage CMO/REMIC, with a "Lower REMIC" and an "Upper REMIC." The underlying securities to be restructured into the PROs and IOs are placed into the Lower REMIC where they generate the principal and interest cash flows that collateralize the new securities to be issued. The system then creates two variable rate bonds ("LA" and "LB" bonds) in the Lower REMIC.

The LA and LB bonds are then placed into the Upper REMIC as the collateral that generates the principal and interest cash flows that collateralize the new securities to be issued by the Upper REMIC. The Upper REMIC may issue four securities:

a) an interest-only security that receives 100% of the interest paid on the LA bond, b) an interest-only security that receives 100% of the interest paid on the LB bond, and c) two principal-only securities that have respective principal amounts and payment priorities equal to the above-described PRO securities.

BRIEF DESCRIPTION OF THE DRAWINGS

The accompanying drawings, referred to herein and constituting a part hereof, illustrate preferred embodiments of the invention, and, together with the description, serve to explain the principles of the invention, wherein.

DETAILED DESCRIPTION OF THE INVENTION

Figure 1:
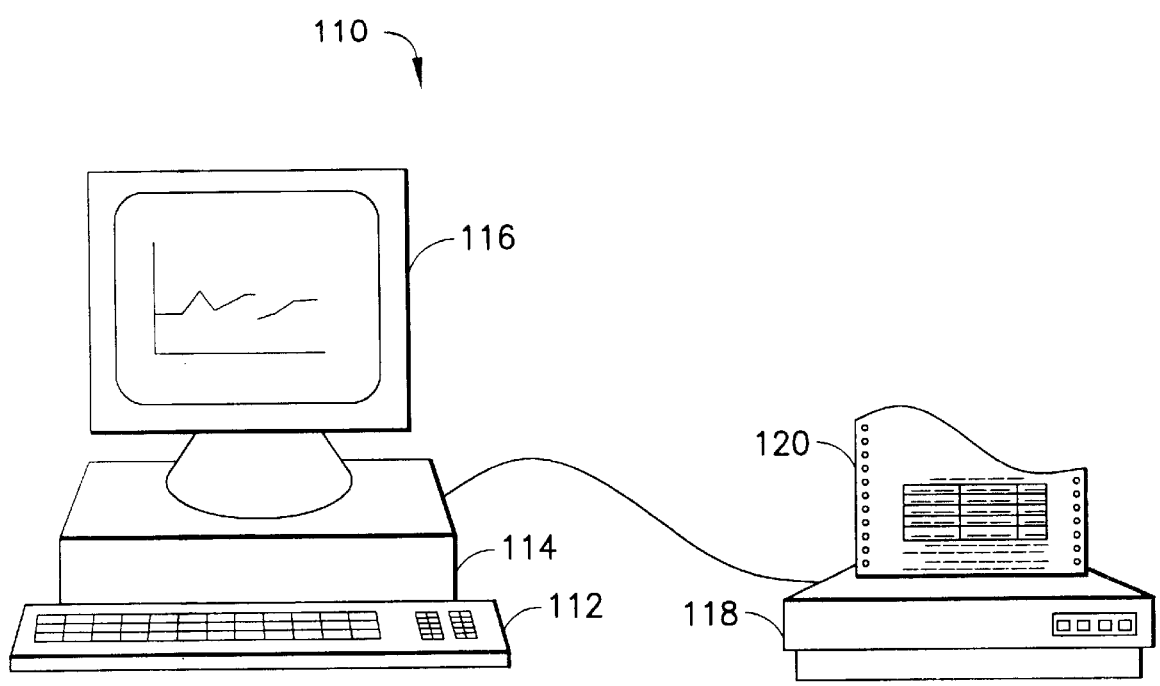
FIG. 1 is a data processing system implementing the mortgage-backed securities system according to the invention.

As shown in FIG. 1, the mortgage-backed securities system according to the invention preferably includes a data processing system 110 comprising (i) means for entering 112 (e.g., an alphanumeric keyboard) the financial data concerning the underlying mortgage securities that are to be analyzed and restructured, (ii) a processing unit 114 (e.g., an IBM AT series personal computer) with associated data storage memory and I/O capability to perform analysis on underlying securities and to structure and analyze new securities, (iii) means for providing system output 116, 118 (e.g., a graphics quality CRT, a hardcopy printer or both) that describes the structure and the financial performance characteristics of newly created securities, and (iv) means to structure and describe financial parameters so that regulatory requirements are satisfied.

The data processing system also includes a means for determining and providing visual output on (v) how available cash flows will be distributed among newly created securities, (vi) the timing and cash flow amounts that are projected to be paid to security holders under a variety of interest rate and prepayment scenarios, and (vii) the yield, duration, average life and other financial performance measures that describe the newly created securities.

The means for entering 112 also provides the user with constant interactive access to the system that enables the user to alter the structure of the newly created securities and evaluate the financial effect of such changes on the performance characteristics, marketability and value of the securities. The system also constantly monitors the profit or loss the user would realize if the new securities were to be created as described. The means for providing system output also provides the user with the facility to print reports 120 on the analysis of any proposed securities, drafts of any new securities to be issued and checks to holders of issued securities when payments are due.

Figure 2:
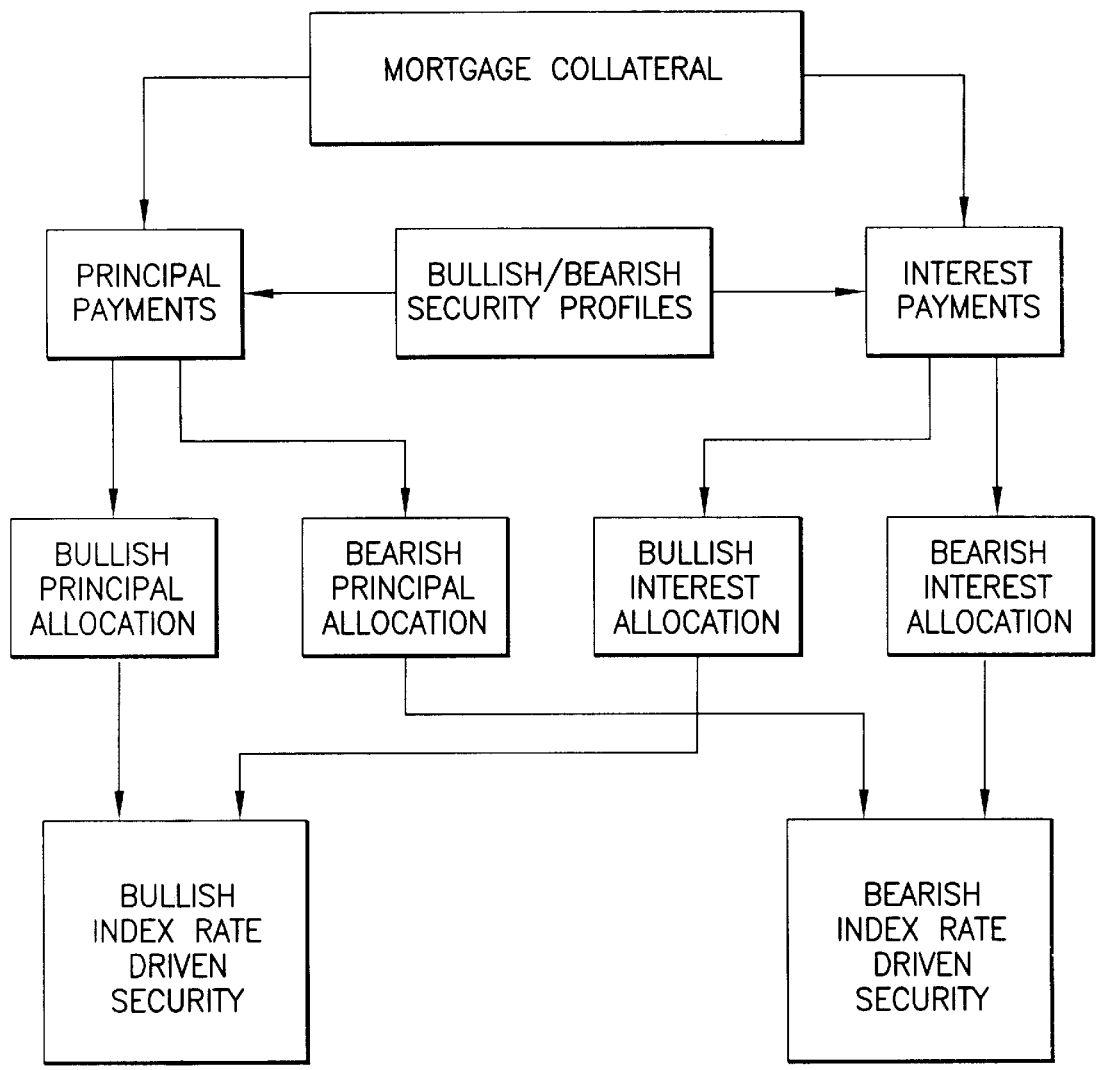
FIG. 2 is a conceptual overview of the mortgage-backed securities system according to the invention.

The mortgage-backed securities system according to the invention is particularly adapted to restructure underlying securities and to create new securities with bullish and bearish characteristics in accordance with investor preferences. A bullish security is considered to be a security whose value increases as interest rates decline and a bearish security is considered to be a security whose value increases as interest rates rise. A conceptual overview of the mortgage-backed securities system is shown in FIG. 2. The preferred method and apparatus for implementing the system are detailed hereinafter.

Figure 3:
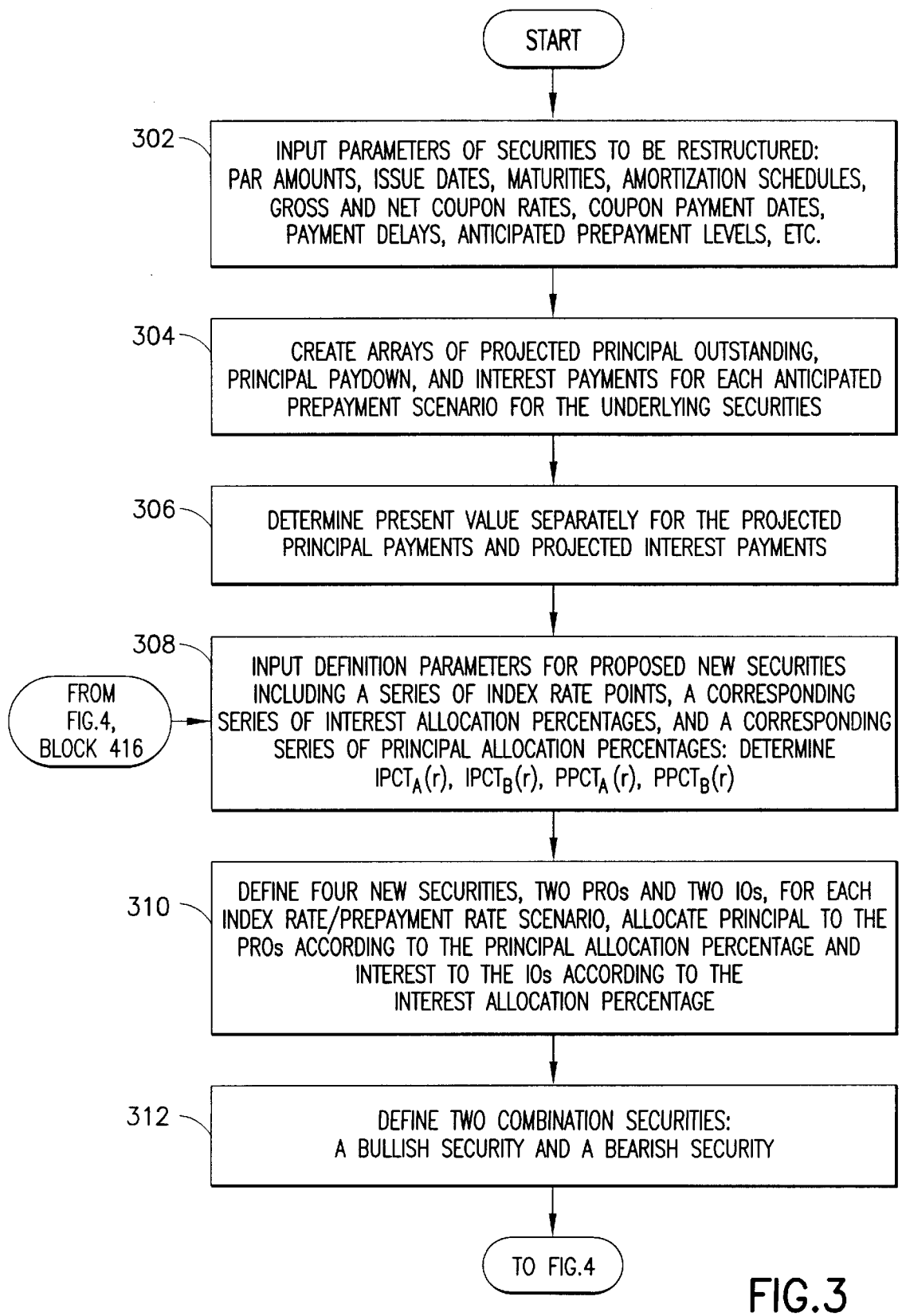
FIG. 3 is a flow chart illustrating the operation of the system wherein underlying securities are restructured and new securities are defined.

Flowcharts illustrating the operation of the data processing system according to the invention is shown in FIGS. 3 through 8. Referring to FIG. 3, data that describes the securities to be restructured (the "underlying securities" or the "collateral") is entered at block 302. The underlying securities may be residential mortgage loans, pools of such loans, or other securities derived from mortgage loans or securities that were issued as regular interest in another REMIC. The underlying securities must qualify as collateral in a CMO/REMIC under REMIT regulations.

The underlying securities may have a variety of maturity dates, amortization schedules, issue dates, fixed or floating coupon rates, payment delays, interest payment dates, prices, and anticipated prepayment rates. This and any other information necessary to determine the projected principal and interest payments under proposed scenarios is entered at block 302. The principal amount of the collateral that is outstanding for any period is denoted by $PRN_c$ and its coupon rate (i.e., Interest Rate) is denoted by $CPN_c$.

Based on this data, the system creates a data array in memory at block 304. This data file includes the remaining principal balance, the amount of principal paid and the amount of interest paid on each of the underlying securities. These data items are calculated at each principal and/or interest payment period (usually monthly) and for each requested interest rate and prepayment scenario that might affect the timing or amount of any of the payments. The data items are then aggregated into a single array in memory that contains the projected remaining balance, principal payment and interest payment that would occur at each payment period under each interest rate and prepayment rate scenario for the aggregate of the underlying securities.

At block 306, the system separates the cash flows produced at block 304 into two separate arrays in memory; one file that contains only the principal payments on the aggregate underlying securities and one file that contains only the interest payments. The system allocates the aggregate cost entered at block 302 between the principal and the interest based on market yields or input prices.

At block 308, the parameters are input that define how the principal and interest cash flows generated by the underlying securities are to be allocated among new securities to be issued. At each period that a cash flow occurs, the allocation depends on the value of an "Index Rate" applicable to that period. The choice of the Index Rate is specified at block 308 and should be a recognized objective interest rate (e.g., the 30 day Treasury Bill rate) or some other rate provided for by REMIC regulations. An Allocation Formula/Table is then specified at block 308 and is stored in memory. This Allocation Formula/Table file determines how the cash flows are to be allocated for any given value of the Index Rate and includes:

a) a series of specified values for the Index Rate, $R_1$, $R_2, \ldots, R_N, R_{N+1}$ (where N is a positive integer) in ascending or descending order (e.g., 3%, 5%, 7%, 10%);

b) a corresponding series of Interest Allocation Percentages, $IPCTA_1$, $IPCTA_2, \ldots, IPCTA_N$, $IPCTNA_{N+1}$ with values between 0% and 100% (e.g., 15%, 35%, 65%, 90%); and c) a corresponding series of Principal Allocation Percentages, $PPCTA_1$, $PPCTA_2, \ldots, PPCTA_N$, $PPCTA_{N+1}$ with values between 0% and 100%.

TABLE 1

Allocation Formula/Table

| Index Rate | $R_1 = 3.0\%$ | $R_2 = 5.0\%$ | $R_3 = 7.0\%$ | $R_4 = 10.0\%$ |
|---|---|---|---|---|
| Principal Allocation Percentage | $PPCTA_1 = 24\%$ | $PPCTA_2 = 44\%$ | $PPCTA_3 = 80\%$ | $PPCTA_4 = 100\%$ |
| Interest Allocation Percentage | $IPCTA_1 = 15\%$ | $IPCTA_2 = 35\%$ | $IPCTA_3 = 65\%$ | $IPCTA_4 = 90\%$ |

The Allocation Formula/Table is designed to function as follows. At each payment period, the applicable value "r" of the Index Rate is determined (usually by consulting one or more publications or news services) and the value of $IPCT_A(r)$ is determined where $IPCT_A(r)$ represents the percentage of total interest to be allocated by the proposed security $IO_A$. $IPCT_A(r)$ is the general formula for the Interest Allocation Percentage and is defined as follows:

a) $IPCT_A(r) = IPCTA_1$ if $r \leq R_1$, i.e., $IPCT_A(r)$ equals the allocation value corresponding to the lowest listed Index Rate in the Allocation Formula/Table if the applicable Index Rate is less than the lowest listed Index Rate;

b) $IPCT_A(r) = IPCTA_{N+1}$ if $r \geq R_{N+1}$, i.e., $IPCT_A(r)$ equals the allocation value corresponding to the highest listed Index Rate in the Allocation Formula/Table if the applicable Index Rate is greater than the highest listed Index Rate;

c) $IPCT_A(r)$ is derived by linear interpolation from the Allocation Formula/Table for all other values of the applicable Index Rate r (i.e., if $R_1 < r \leq R_{N+1}$).

Using the standard form of a linear function, the allocation percentage can be expressed in terms of the applicable Index Rate as follows:

a) $INTP_A(r) = IPCTA_1$ if $r \leq R_1$
b) $INTP_A(r) = IPCTA_{N+1}$ if $r > R_{N+1}$
c) $INTP_A(r) = m_k \times r + b_k$ if $R_k < r \leq R_{k+1}$ for $k = 1, \ldots, N$ where $$m_k = \frac{IPCTA_{k+1} - IPCTA_k}{R_{k+1} - R_k} \text{ and } b_k = IPCTA_k - m_k \times R_k$$

$IPCT_B(r)$ is de fined to equal 100% minus the Interest Allocation Percentage, $IPCT_A(r)$, and $IPCT_B(r)$ represents the percentage of total interest to be allocated to the $IO_B$ security. Then a) $IPCT_B(r) = 100\% - IPCT_A(r) = 100\% - IPCTA_1$ if $r \leq R_1$
b) $IPCT_B(r) = 100\% - IPCT_A(r) = 100\% - IPCTA_{N+1}$ if $r > R_{N+1}$
c) $IPCT_B(r) = 100\% - IPCT_A(r) = n_k \times r + d_k$ if $R_k < r \leq R_{k+1}$ where $n_k = -m_k$ and $d_k = 100\% - b_k$. Similarly, $PPCT_A(r)$ and $PPCT_B(r)$ are determined where $PPCT_B(r) = 100\% - PPCT_A$.

At block 310, the principal and interest payments derived from the underlying securities will be distributed among four proposed securities; two securities $IO_A$ and $IO_B$ that will receive only interest payments and two securities $PRO_A$ and $PRO_B$ that will receive only principal payments. $IO_A$ will receive the total interest amount generated by the underlying securities at each period multiplied by the Interest Allocation Percentage $IPCT_A(r)$ calculated in block 308; $IO_B$ will receive the remainder of the interest.

Since the interest paid on the underlying securities equals $PRN_C \times CPN_C$ where $PRN_C$ is the principal balance and $CPN_C$ is the interest or coupon rate for the period, a) the interest paid to $IO_A = PRN_C \times CPN_C \times IPCT_A(r)$
b) the interest paid to $IO_B = PRN_C \times CPN_C \times IPCT_B(r)$ where r is the applicable value of the Index Rate. It may be appreciated that since the total amount of interest paid on a mortgage may vary depending on when the mortgage is paid off, the total cashflow of $IO_A$ and $IO_B$ may also vary.

The allocation of principal payments to the principal-only securities differs from that for the interest-only securities in that each of $PRO_A$ and $PRO_B$ is assigned a stated principal amount which is specified at block 310 and which in total cannot exceed $PRN_C$. The total amount of principal that each of these securities may receive is limited to its stated principal amount. The principal payments generated by the underlying securities at each period are distributed to $PRO_A$ and $PRO_B$ in accordance with the Principal Allocation Formulas $PPCT_A(r)$ and $PPCT_B(r)$ as derived from the Allocation Formula/Table. However, once one of the two principal-only securities has received principal payments equal to its initial stated principal, it may receive no more principal. At that point, all future principal payments are allocated to the other principal-only security until it receives all of its stated principal. It may be appreciated that since the principal amounts of $PRO_A$ and $PRO_B$ are specified, only the timing as to when they receive their respective cash flows may vary—their total amounts cannot vary.

At block 310, the data processing system creates four new arrays as files in memory which represent four proposed securities. The $IO_A$ and $IO_B$ (Interest Only A and B) arrays represent the proposed securities that will receive payments of a portion of the interest only that is generated by the underlying securities; the $PRO_A$ and $PRO_B$ (PRincipal Only A and B) arrays will receive only principal payments. The first element in each array represents the price to be paid for the security on the settlement date. Each array also has additional elements corresponding to each payment date of the underlying securities. For each payment period, the principal payment cash flows that were projected at block 304 are divided between $PRO_A$ and $PRO_B$; $PRO_A$ is allocated the portion specified by the Principal Allocation Percentage from the Allocation Formula/Table and $PRO_B$ is allocated the remainder of the projected principal payment. Similarly, the projected interest payments generated by the underlying securities are divided between the proposed $IO_A$ and $IO_B$ securities in accordance with the Interest Allocation Percentage from the Allocation Formula/Table. It may be appreciated that the number of elements of each array for each cash flow period corresponds to the number of Index Rate and prepayment scenarios specified at block 302.

As an example, if the Index Rate at the specific payment date is 7.0% and the Principal Allocation Percentage is 80% and the Interest Allocation Percentage is 65% as illustrated in TABLE 1, $PRO_A$ would receive 80% of all principal paid on that date and $PRO_B$ would receive the remaining 20% of principal whereas $IO_A$ would receive 65% of the interest paid on that date and $IO_B$ would receive 35% of the interest. It may also be appreciated that while the amount of principal and interest available for distribution will depend on the prepayment rate as well as other factors, the percentages of the principal and interest that each of the proposed securities receive depends only on the Index Rate applicable to the cash flow period and the specified allocation.

At block 312 combination securities from the $PRO_A$, $PRO_B$, $IO_A$ and $IO_B$ securities may be created. In particular, the data processing system may automatically analyze two specific combinations which have significant market appeal: 1) a bullish combination security that consists of the PRO and IO securities that would be expected to perform best when interest rates are low, and 2) a bearish combination security that would be expected to perform best when interest rates are high. These combination securities will often possess overall performance characteristics that are similar to conventional Principal-Only (PO) and Interest-Only (IO) securities that pay only a fixed percentage of the principal-only or the interest-only payments generated by the collateral, respectively. The performance of the securities created by utilizing this invention, however, can be predicted and controlled more accurately than conventional PO and IO securities because the allocation percentages may be variable. In addition, the performance of the new securities is far less subject to influence by factors other than changes in the Index Rate. In addition, each of the new combination securities has a stated principal amount (equal to the principal of its PO component) that must be repaid and may therefore be a permissible investment for many institutional clients that are precluded from purchasing conventional IO-type securities which do not guarantee the return of any principal.

Figure 4:
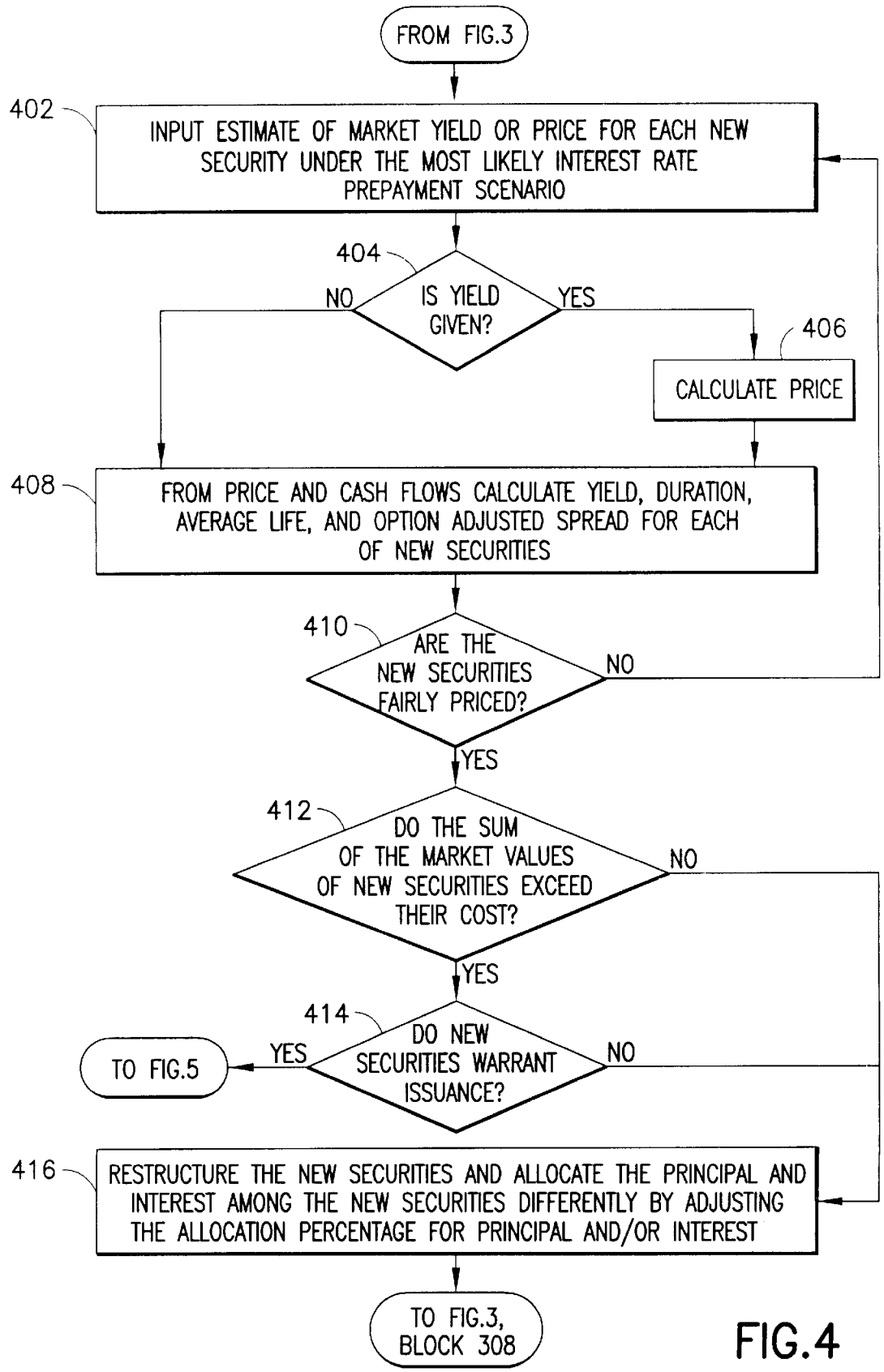
FIG. 4 is a flow chart illustrating the operation of the system wherein proposed new securities are evaluated.

Referring to FIG. 4, at block 402 an estimate of the market price for each of the proposed securities is entered. Alternatively, an estimate of the market yield at which the securities would be salable may be input (together with an Index Rate and prepayment scenario under which the market yield would apply). If a yield was entered at block 402, which is decided at block 404, the corresponding price that would result in that yield under the specified interest rate and prepayment scenario must be calculated.

At block 406, the system calculates a price if a yield was entered at block 402 by discounting the projected cash flows for the given scenario at the specified yield. If a price was entered at block 402, the system proceeds to block 408.

The data processing system now has available to it an estimate of the price/market value for each of the new securities and may now prepare a detailed analysis of the proposed securities. Using the input or calculated price, the data processing system calculates the yield, the duration, the average life (for the PROs) and the start and end dates of the cash flows for each of the proposed securities. These calculations are performed at block 408 from the cash flow arrays created at block 310. The calculations are performed for each Index Rate and prepayment rate scenario that was input in block 302. The results calculated at block 408 may provide an overall analysis of how each of the proposed securities would perform under the potential market scenarios specified in blocks 302 and 308. The results obtained by the data processing system may either be displayed on a CRT or printed.

Upon examining the results of block 408, a decision may be made as to whether the proposed securities are fairly priced at the estimated prices/yields input at block 402. If the proposed securities are fairly priced, the data processing system may be instructed at block 410 to continue to block 412. If not, the system returns to block 402 where the previous set of price/yield estimates nay be replaced by another set of estimates. This iterative loop from block 402 to block 410 is repeated until a best estimate of prices/yields for the proposed securities is determined.

At block 412, the estimate of the prices at which the proposed securities can be sold, that was determined in block 109, may then be compared to the cost of issuing these securities which includes the cost of the underlying securities plus any underwriting and other issuance costs such as rating agency fees, legal and accounting fees, trustee fees, etc. The cost is compared to the sum of the market values of the securities. Based upon the comparison a determination may be made as to whether to proceed with the issuance. Even if the estimated value of the proposed securities exceeds their cost, the difference may not be large enough to warrant their issuance. Furthermore, even if issuance is warranted on cost basis, other potential structures may be examined in an attempt to improve the potential profit and/or marketability of the securities. At block 414 a decision is made as to whether the creation of the proposed securities is desired. If so, the system continues to FIG. 5, otherwise the system proceeds to block 416.

At block 416, the structure of any one or all of the proposed securities may be altered by changing a) the stated principal amounts of $PRO_A$ and $PRO_B$ or b) the Allocation Formula/Table specified at blocks 308, 310. An increase of the Interest Allocation Percentage at any specific Index Rate value insures that $IO_A$ ($IO_B$) will receive a greater (lesser) proportion of the available interest cash flow at all periods for which that value is the applicable value of the Index Rate. A change in the Principal Allocation Percentage has a similar effect on $PRO_A$ and $PRO_B$.

Although the PRO and IO securities or combinations thereof as previously described would be readily marketable to many clients, their direct issuance as regular interests in a CMO/REMIC may not be provided for under current REMIC regulations. Advantageously, however, this invention provides a system for creating these securities in a manner that is permissible and consistent with REMIC regulations. The invention utilizes a multistage REMIC process with a Lower REMIC stage and Upper REMIC stage. The underlying securities serve as the collateral for the Lower REMIC (which itself may constitute a multistage REMIC) which issues a new set of securities LA and LB that have fixed principal amounts and variable interest rates. These securities serve as the collateral for the Upper REMIC, which issues $IO_A$, $IO_B$, $PRO_A$ and $PRO_B$.

Figure 5:
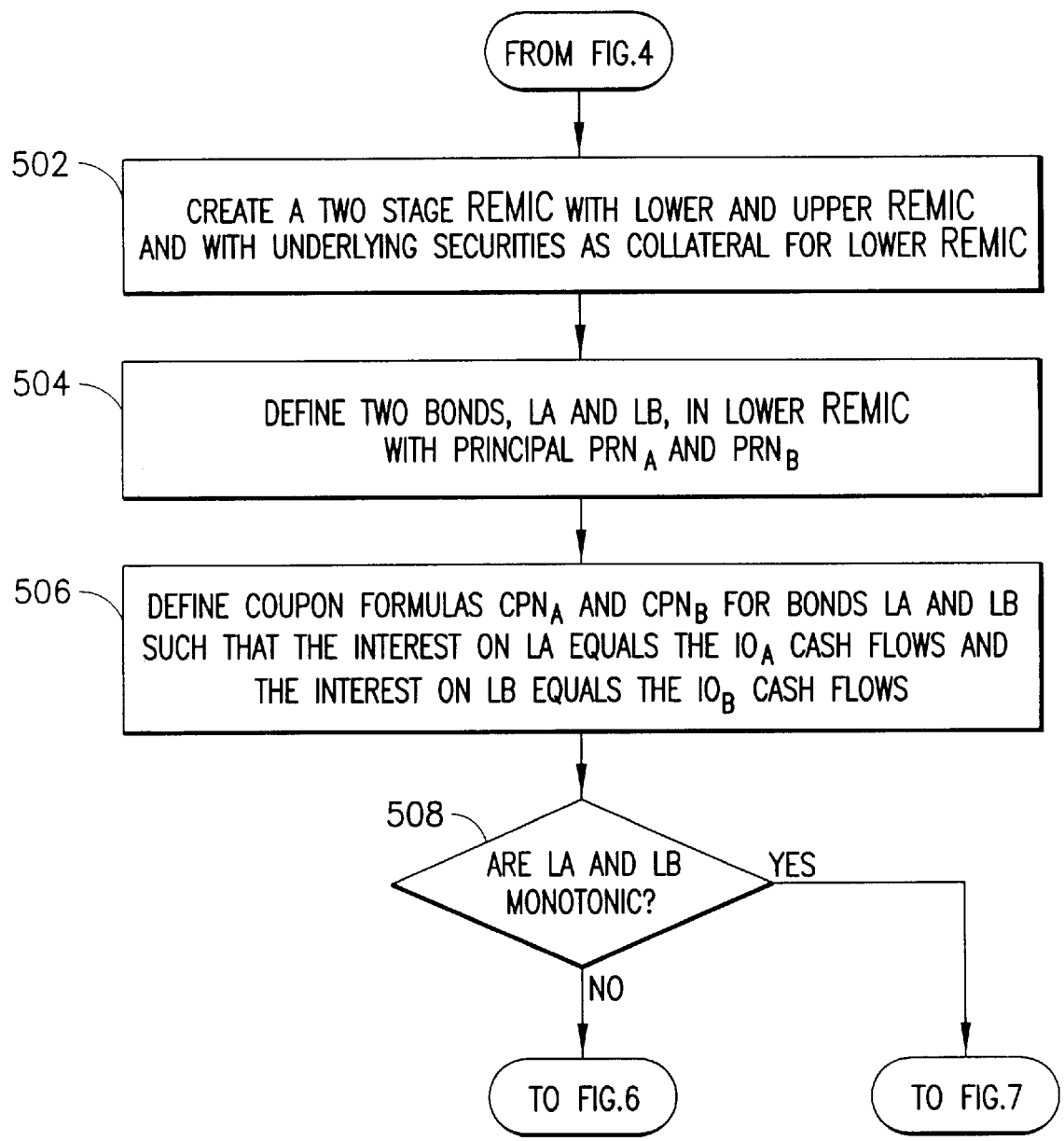
FIG. 5 is a flow chart illustrating the operation of the system wherein a multistage REMIC is created and securities are defined in first stage of the Lower REMIC.
Figure 7:
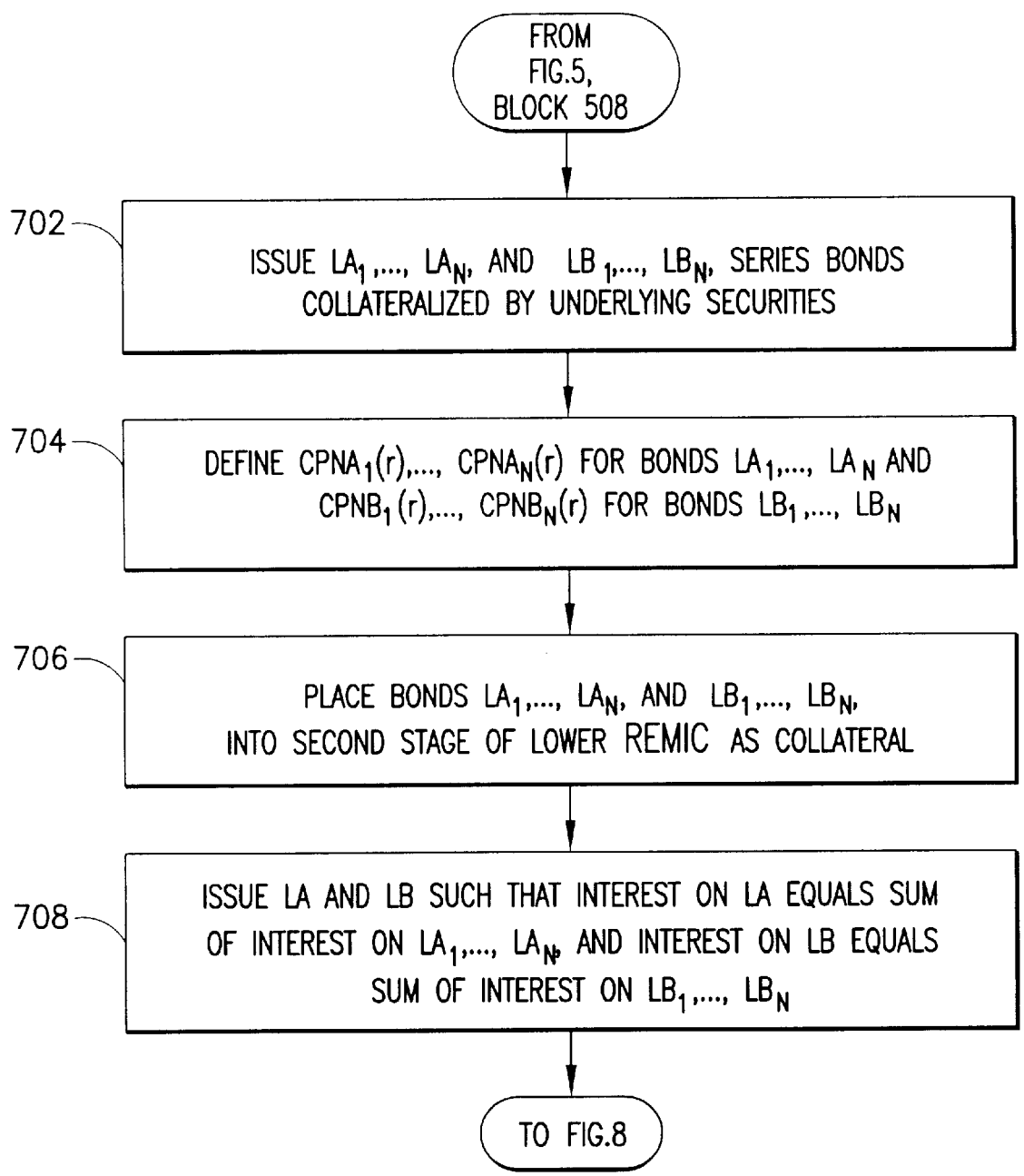
FIG. 7 is a flow chart illustrating the operation of the system wherein new unidirectional multisegment variable rate securities are created in the second stage of the Lower REMIC.
Figure 8:
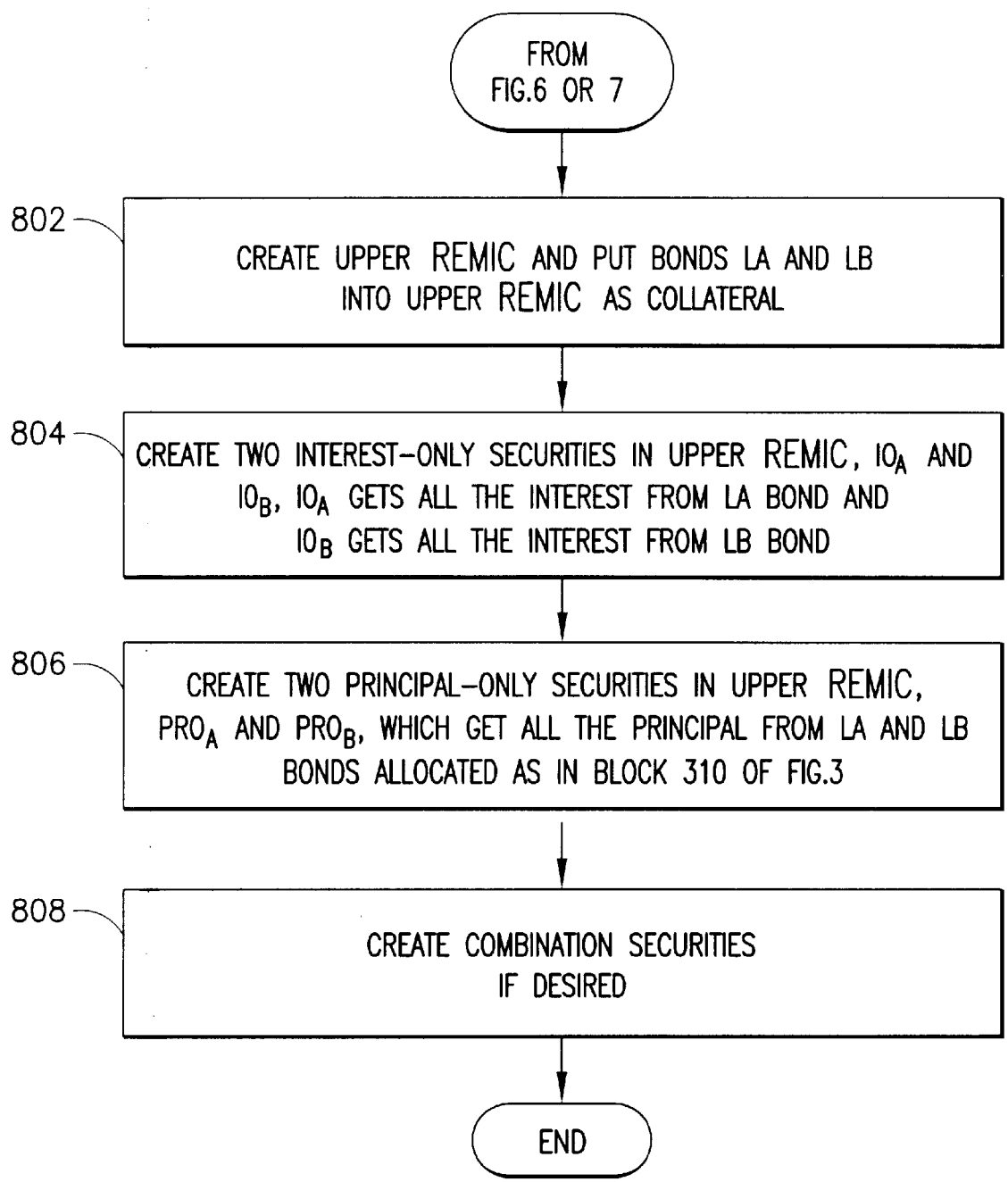
FIG. 8 is a flow chart illustrating the operation of the system wherein new principal-only and interest-only securities are created in the Upper REMIC.

FIGS. 5, 7 and 8 illustrates the operation of the data processing system that creates securities $IO_A$, $IO_B$, $PRO_A$ and $PRO_B$ with the properties described in blocks 308 and 310 of FIG. 3 using a multistage CMO/REMIC procedure.

In general, the data processing system according to the invention accomplishes the creation of the proposed securities in the following manner. In the Lower REMIC, two bonds (LA and LB) with the following characteristics are issued, a) LA and LB each have a stated principal amount and a interest rate formula that qualify them as regular REMIC interests, b) the principal cash flows generated by the underlying securities are passed through simultaneously to LA and LB in proportion to their stated principal amounts, c) the interest paid each period on LA equals the interest to be paid each period on the proposed $IO_A$ security, and d) the interest paid each period on LB equals the interest to be paid each period on the proposed $IO_B$ security.

The LA and LB bonds are then placed into another REMIT (i.e., the Upper REMIC) where they serve as the collateral for the issuance of the proposed new securities as follows, a) an interest only security ($IO_A$) that receives 100% of the interest paid on the LA bond, $IO_A$ receives no principal payments;
b) an interest only security ($IO_B$) that receives 100% of the interest paid on the LB bond, $IO_B$ receives no principal payments; and
c) two principal only securities ($PRO_A$ and $PRO_B$) that have respective principal amounts and payment priorities equal to the above-described principal only securities.

It may be appreciated that, since $IO_A$ is an interest-only strip of LA, it qualifies as a regular REMIC security under REMIC regulations. Similarly, $IO_B$ is a 100% interest-only strip of LB which also qualifies it as a REMIC regular interest.

Although the cash flows of the $IO_A$ and $IO_B$ securities in effect equal a variable portion (that may change periodically) of the interest amount on the underlying securities, their creation by the means of this invention, however, is consistent with current REMIC regulations because the invention creates the $IO_A$ and $IO_B$ securities by combining fixed portion (i.e., 100%) of the interest amount on a group of other regular REMIC securities; (i.e., the LA and LB bonds).

The procedure for accomplishing this is as follows. At block 502, a two stage CMO/REMIC with an Upper and Lower stage is created. The underlying securities are placed into the Lower stage of this CMO/REMIC as the collateral that generates the cash flows to be restructured. The principal amount is denoted by $PRN_C$, the coupon rate (i.e., interest rate) is denoted by $CPN_C$.

At block 504, two variable rate bonds, LA and LB, are defined such that a) the sum of their principal amounts, $PRN_A$ and $PRN_B$, equals the total principal, $PRN_C$, of the underlying securities, and b) principal payments as they occur will be distributed simultaneously to the LA and LB bonds in proportion to their principal amounts.

At block 506, the coupon formula (i.e., interest rate formula) for LA is defined such that the interest that would be paid (i.e., principal times coupon rate) on LA each period equals the amount to be paid to proposed security $IO_A$ as calculated at block 310. The mathematical formula for this is:

$$CPN_A(r)=(PRN_C/PRN_A) \times CPN_C \times IPCT_A(r)$$

It may be appreciated that since the interest paid on bond LA is determined by multiplying its coupon rate $CPN_A(r)$ by its outstanding principal $PRN_A$, this equals $$PRN_A \times CPN_A(r) = PRN_A \times (PRN_C/PRN_A) \times CPN_C \times IPCT_A(r) = PRN_C \times CPN_C \times IPCT_A(r)$$

which is the amount of interest to be paid to $IO_A$ as determined at block 310.

The coupon formula for LB is defined similarly as, $$CPN_B(r)=(PRN_C/PRN_B) \times CPN_C \times IPCT_B(r)$$

The total interest paid each period on bond LB is $$PRN_B \times CPN_B(r) = PRN_B \times (PRN_C/PRN_B(r)) \times CPN_C \times IPCT_B(r)$$
$$= PRN_C \times CPN_C \times IPCT_B(r)$$

which equals the cash flow amount of $IO_B$ as determined at block 310.

It may be appreciated from the above formulas that whereas the coupon formulas for LA and LB depend on the principal amounts ($PRN_A$ and $PRN_B$) of LA and LB, the amount of interest paid on LA and LB do not depend on $PRN_A$ and $PRN_B$. Therefore, $PRN_A$ may be increased and $PRN_B$ decreased, or vice versa, without altering their interest payments which are designed to equal the cash flow amounts of $IO_A$ and $IO_B$. The choice of $PRN_A$ and $PRN_B$ may therefore be optional and the simplest choice is $PRN_A = PRN_B = PRN_C/2$. At times a different choice may be necessary to ensure that LA and LB qualify as regular REMIC interests.

To illustrate, REMIC regulations may require that the total market value of certain regular interests do not exceed 125% of the principal amount of the security. Thus, if the anticipated market value of the LA bond (value of principal plus value of interest payments) is judged to exceed 125% of its principal amount, $PRN_A$, an increase in principal amount may bring the bond back into compliance. For example, assume $PRN_A=\$50$ million and its value is $40 million (i.e., each dollar of principal is valued at eight cents) and assume the value of the interest payments on LA is $25 million. Then the total value of LA is $65 million which is 130% of its principal amount of $50 million. However, if $PRN_A$ is increased to $60 million (and $PRN_B$ decreased to $40 million) then the value of the principal is $48 million (80% of $40 million) and the total value of LA is $73 million (since value of interest is fixed at $30 million) which is 121.667% of the principal amount of $60 million. It is an advantage of this invention that an arbitrary choice may be made initially for $PRN_A$ and $PRN_B$ and a final choice may be made at the time of final issuance of the securities without compromising the validity of the results.

If the formulas for $IPCT_A(r)$ and $IPCT_B(r)$ as determined at block 310 are substituted into $CPN_A(r)$ and $CPN_B(r)$ then, a) $CPN_A(r)=(PRN_C/PRN_A) \times CPN_C \times IPCTA_1$ if $r<R_1$
b) $CPN_A(r)=(PRN_C/PRN_A) \times CPN_C \times IPCTA_{N+1}$ if $r \geq R_{N+1}$
c) $CPN_A(r)=(PRN_C/PRN_A) \times CPN_C \times \{m_k \times r + b_k\}$ if $R_k < r \leq R_{k+1} = mA_k \times r + bA_k$ where $m_k$ and $b_k$ were determined at block 104 for k=1, ..., N, and $mA_k=(PRN_C/PRN_A) \times CPN_C \times m_k$ and $bA_k=(PRN_C/PRN_A) \times CPN_C \times b_k$ For bond LB, a) $CPN_B(r)=(PRN_C/PRN_B) \times CPN_C \times (1-IPCTA_1)$ if $r<R_1$
b) $CPN_B(r)=(PRN_C/PRN_B) \times CPN_C \times (1-IPCTA_{N+1})$ if $r \geq R_{N+1}$
c) $CPN_B(r)=(PRN_C/PRN_B) \times CPN_C \times \{n_k \times r + d_k\}$ if $R_k < r \leq R_{k+1} = nB_k \times r + dB_k$ where $n_k$ and $d_k$ are as described at block 310 for k=1, ..., N; and $nB_k=(PRN_C/PRN_B) \times CPN_C \times n_k$ and $dB_k=(PRN_C/PRN_B) \times CPN_C \times d_k$ This type of bond is called a multisegment variable rate bond because when the Index Rate r falls within each specified range $[R_k, R_{k+1}]$ of the Index Rate its coupon formula is determined by a linear function of the Index Rate. The issuance of such bonds however as regular REMIC interests is not directly provided for by current REMIC regulations. Utilization of the data processing system according to this invention, however, enables their issuance as qualifying regular interests in a REMIC within the provisions of current regulations. The detailed procedure for issuance of a regular REMIC interest that is equivalent to such a multisegment variable rate bond is described in more detail below with respect to FIG. 6 and FIG. 7.

The data processing system according to the invention particularly enables the issuance of a regular REMIC security equivalent to a multisegment variable rate bond. A multisegment variable rate bond has:

a) a stated principal amount and a coupon formula that depends on a specified Index Rate such that, b) the coupon formula may be expressed as a linear function of the Index Rate within each of several predefined ranges of the Index Rate.

Figure 9:
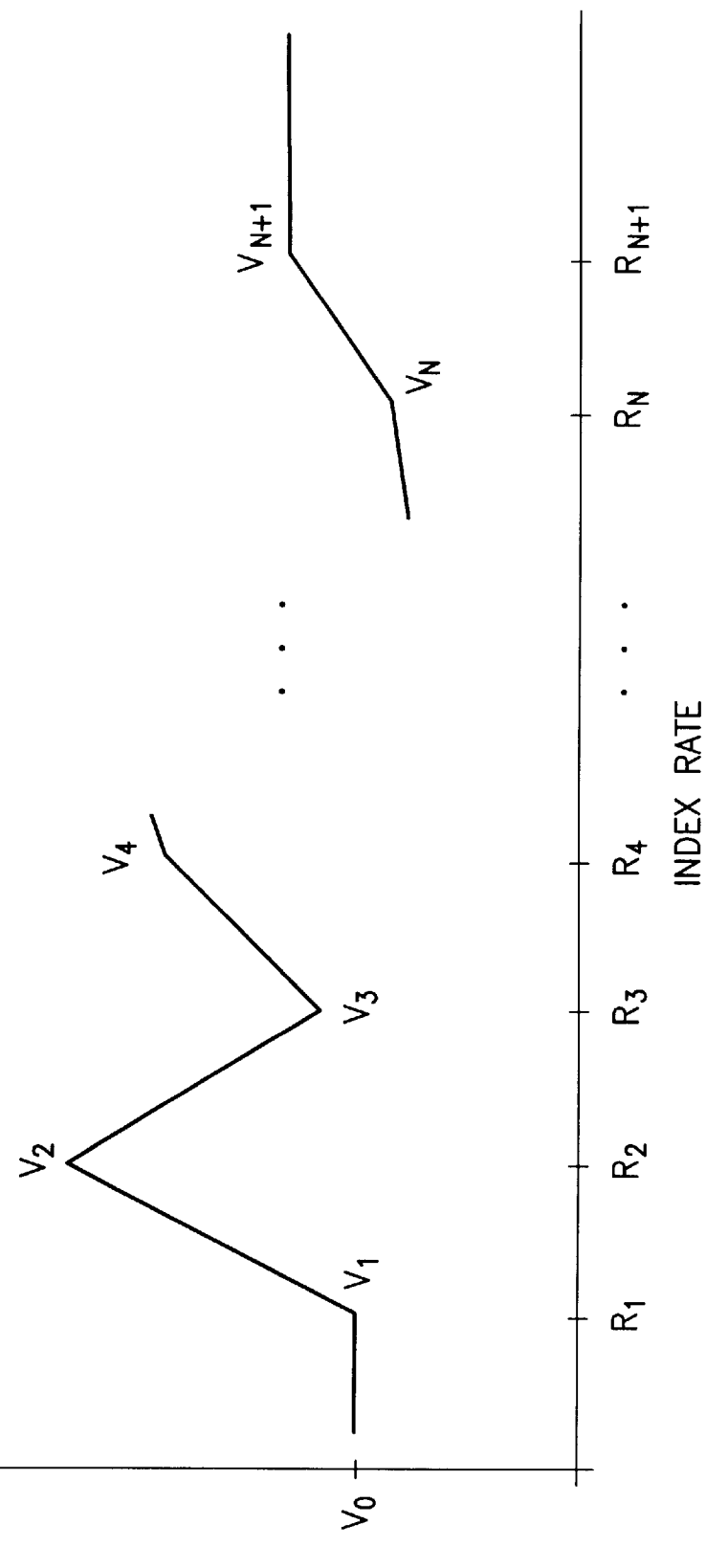
FIG. 9 is a graphical illustration of the coupon formula for a multisegment variable rate security.

Notationally, the coupon formula can be written as, a) $CPN(r)=m_1 \times R_1 + B_1$ if $r \leq R_1$ b) $CPN(r)=m_k \times r + B_k$ if $R_k < r \leq R_{k+1}$ for k=1, 2, . . . , N c) $CPN(r)=m_N \times R_{N+1} + B_N$ if $r > R_{N+1}$ and is graphically illustrated in FIG. 9.

It may be appreciated that the LA and LB bonds as defined at blocks 504 and 506 are multisegment variable rate bonds since their coupon formulas $CPN_A(r)$ and $CPN_B(r)$ are of the form described here. It may also be appreciated that the creation of single segment variable rate bond that has a coupon formula consisting of, a) a multiplier times an Index Rate, plus (or minus) a fixed percentage of interest, and b) is subject to a minimum and a maximum interest rate is directly provided for by REMIC regulations. Thus, the coupon rate formula above would qualify as the coupon formula for a REMIC bond if the formula had only one multiplier $m_1$ and one offset $b_1$, i.e., if it were only a single segment rate bond.

Two important special cases of a multisegment bond are where a) CPN(r) may only increases as r increases (i.e., $CPN(r_1) \leq CPN(r_2)$ if $r_1 \leq r_2$); and b) CPN(r) decreases as r increases (i.e., $CPN(r_1) \geq CPN(r_2)$ if $r_1 \leq r_2$).

These are called monotonic multisegment variable rate bonds.

The data processing system according to the invention includes a general procedure for creating a bond that qualifies as regular interest in a REMIC and is equivalent to any specified multisegment variable rate bond. In addition, this invention also includes an additional procedure for creating a regular REMIC security that is functionally equivalent to a specified monotonic multisegment variable rate bond.

At block 508 the coupon formulas $CPN_A(r)$, $CPN_B(r)$ of LA and LB are examined. If they are monotonic, the system branches to FIG. 7 to create bonds LA and LB. Otherwise, the system procedes to FIG. 6.

Figure 6:
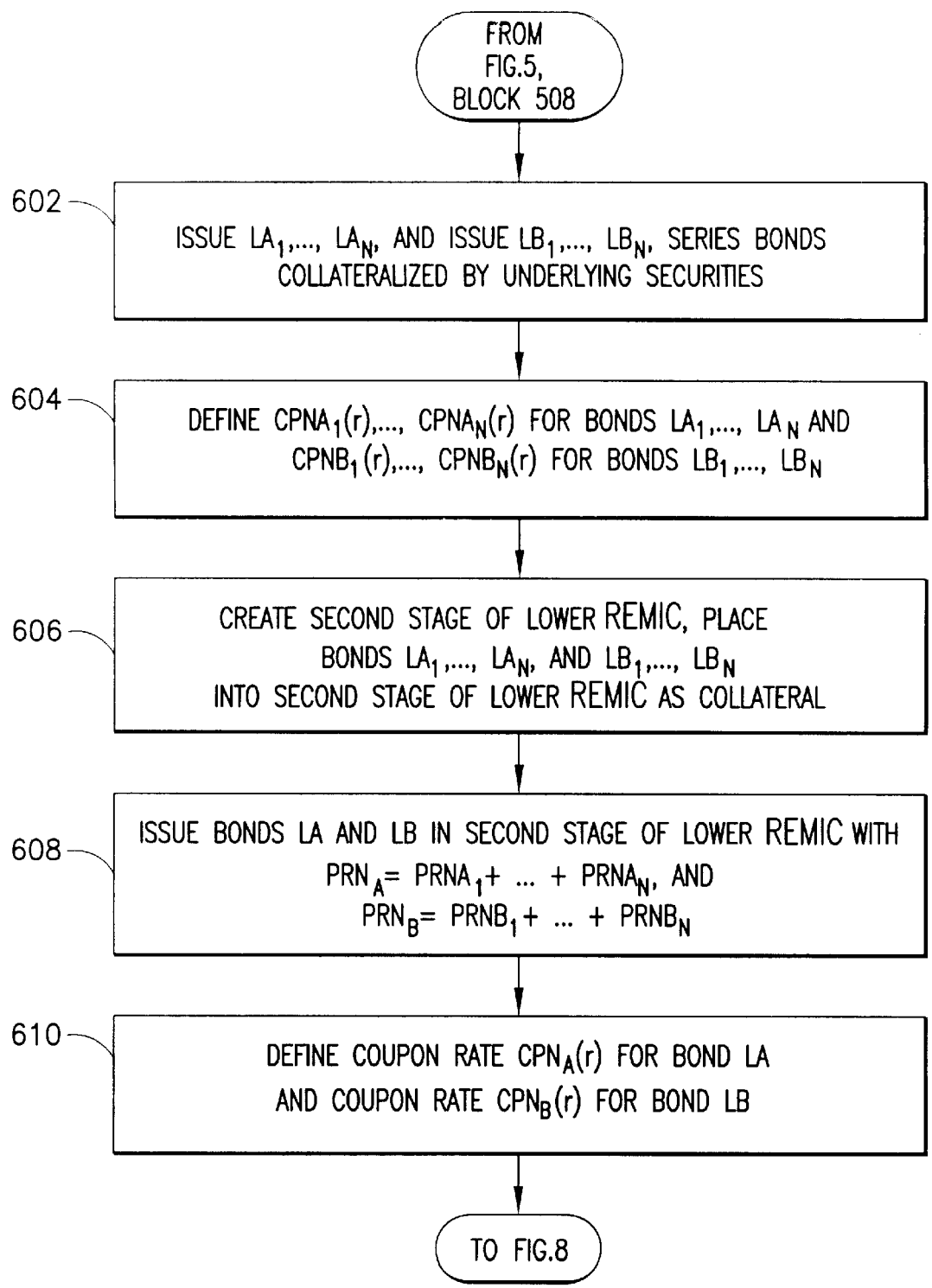
FIG. 6 is a flow chart illustrating the operation of the system wherein new multisegment variable rate securities are created in the second stage of the Lower REMIC.

FIG. 6 is a schematic representation of how the system according to the invention may be utilized to create a bond that qualifies as a regular interest under REMIC regulations and is equivalent to a specified multisegment variable rate bond. FIG. 7 is the schematic representation of the procedure for the monotonic case.

At FIG. 6, block 602, two series of bonds $LA_1, \ldots, LA_N$ and $LB_1, \ldots, LB_N$ with corresponding principal amounts $PRNA_1, \ldots, PRNA_N$ and $PRNB_1, \ldots, PRNB_N$ are issued such that $PRNA_1 + \ldots + PRNA_N = PRN_A$ and $PRNB_1, \ldots, PRNB_N = PRN_B$ where $PRN_A$ and $PRN_B$ are the principal amounts of bonds LA and LB as defined in block 506. Principal is paid simultaneously to all of these bonds in proportion to their principal amounts.

For simplicity it may be assumed that $PRNA_1 = \ldots = PRNA_N = PRN_A/N$ and $PRNB_1 = \ldots = PRNB_N = PRN_B/N$. However, the $IA_k$ and $LB_k$ series bonds need not have equal principal amounts. As was discussed earlier, a different choice for $PRNA_1, \ldots, PRNA_N$ may be necessary to satisfy other REMIC requirements.

Since the issuance of both the LA and LB bonds defined at block 506 occurs simultaneously for both bonds, the remainder of the procedure will be described here in detail for the LA bond only. The procedure is the same for bond LB.

At block 604 the coupon formulas for $LA_1, \ldots, LA_N$ are defined as, a) $CPNA_k(r) = mA_k \times r + bA_k$ for $R_k < r \leq R_{k+1}$ b) $CPNA_k(r) = V_k = CPNA_k(R_k)$ if $r \leq R_k$ c) $CPNA_k(r) = V_{k+1} = CPNA_k(R_{k+1})$ if $r \geq R_{k+1}$ It may be appreciated that for values of the Index Rate, r, within the range $[R_k, R_{k+1}]$, $CPNA_k(r) = CPN_A(r)$. For values outside of the range $[R_k, R_{k+1}]$, $CPNA_k(r)$ equals its value at the end points $R_k, R_{k+1}$ of the range.

It may be appreciated that each individual series $LA_k(r)$ bond is a single segment variable rate bond because its coupon may be expressed as a single linear function of the Index Rate subject to a minimum and maximum rate. Therefore, each of the individual $LA_k$ bonds qualifies as a regular REMIC interest.

At block 606, the second stage of the Lower REMIC is created. Bonds $LA_1, \ldots, LA_N$ are placed into this REMIC as its collateral upon which bond LA will be issued.

At block 608, bond LA is created in the second stage of the Lower REMIC. It receives all the principal payments paid to $LA_1, \ldots, LA_N$ so its principal amount is $PRNA_1 + \ldots + PRNA_N = PRN_A$.

At block 610, the coupon rate formula for bond LA at any value r of the Index Rate is defined to be, $$CPN_A(r) = CPNA_1(r) + CPNA_2(r) + \ldots + CPNA_N(r) - (V_2, \ldots, V_N)$$

where $V_k$ is the value of $CPN_A(r)$ at Index Rate point $R_k$.

It may be appreciated that with this formulation the value of $CPN_A(r)$ is as specified in block 506 for any value r of the Index Rate. This may be shown by evaluating $CPNA_1(r), \ldots, CPNA_N(r)$. Assuming $R_k < r \leq R_{k+1}$ for some k=2, . . . , N.

$CPNA_1(r) = CPNA_1(R_2) = V_2$ since $R_2 < r$ . . .
$CPNA_{k-1}(r) = CPNA_{k-1}(R_k) = V_k$ since $R_k < r$
$CPNA_k(r) = mA_k \times r + bA_k$ since $R_k < r \leq R_{k+1}$
$CPNA_{k+1}(r) = CPNA_{k+1}(R_{k+1}) = V_{k+1}$ since $r \leq R_{k+1}$ . . .
$CPNA_N(r) = CPNA_N(R_N) = V_N$ since $r \leq R_N$ So, $CPNA_1(r) + \ldots + CPN_N(r) = (V_2 + \ldots + V_{k-1}) + mA_k \times r + bA_k + (V_k + \ldots + V_N) = (V_2 + \ldots + V_N) + mA_k \times r + bA_2$ Therefore, $CPN_A(r)$ as defined $CPN_A(r) = [CPNA_1(r) + \ldots + CPNA_N(r)] - (V_2 + \ldots + V_N) = (V_2 + \ldots + V_N) + mA_k \times r + bA_k - (V_2 + \ldots + V_N) = mA_k \times r + bA_k$ which is the desired coupon formula of bond LA as defined at block 506.

It may be appreciated that $CPN_A(r)$ as defined here is the weighted average of the coupon rates on the $LA_1, \ldots, LA_N$, bonds minus a fixed percentage. Since the $LA_1, \ldots, LA_N$ series bonds serve as the collateral for the Upper REMIC, the weighted average of their coupon rates minus a fixed percentage qualifies bond LA as defined in block 608 as a regular REMIC interest.

Thus, the use of the data processing system according to the invention permits the creation of a qualifying regular REMIC interest equivalent to almost any multisegment variable rate bond.

Simultaneously with the issuance of bond LA with coupon formula $CPN_A(r)$ in block 604 through block 610, the data processing system also issues bond LB. The procedure is the same and the resultant coupon formula $CPN_B(r)$ for bond LB will have a value for any Index Rate r that is equal to that defined at block 506.

Having issued bonds LA and LB as defined at block 506, the system continues to FIG. 8 to create bonds $IO_A$ and $IO_B$.

A particular class of multisegment variable rate bonds; that holds particular appeal to many investors are those whose coupon rates cannot decrease as the Index Rate increases and those whose coupon rates cannot increase as the Index Rate increases.

Figure 10:
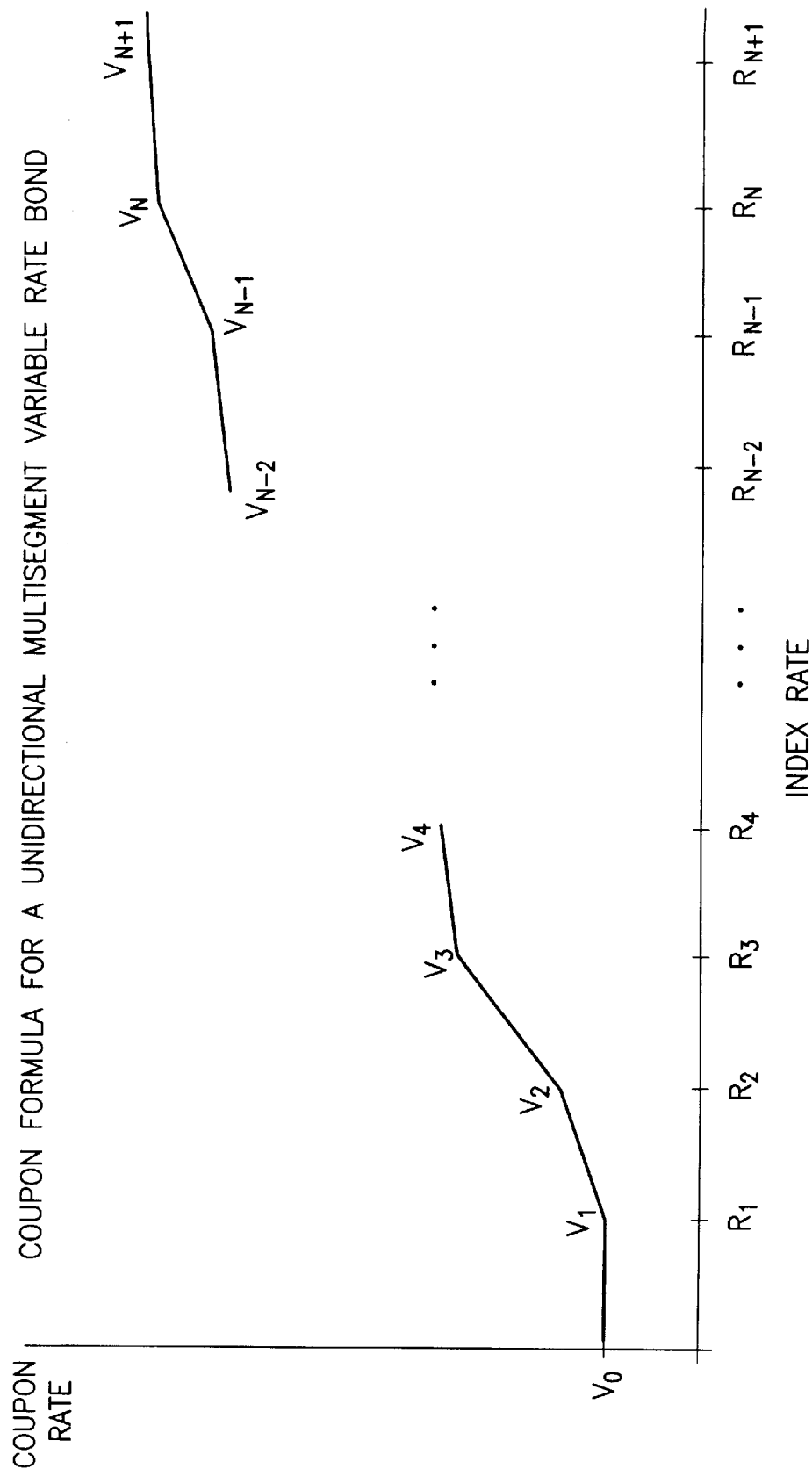
FIG. 10 is a graphical illustration of the coupon formula for a unidirectional multisegment variable rate security.

Although such bonds can be created in a manner that qualifies as a regular interest under REMIC regulations by utilizing the procedure described above with respect to FIG. 6, an alternate procedure that is more efficient at times may be utilized in this special case. If bonds LA and LB as described at blocks 504 and 506 are unidirectional, this procedure may be utilized. The procedure as described below with respect to FIG. 7 is for bond LA which is assumed to have a non-decreasing coupon formula as graphically illustrated in FIG. 10. It will be appreciated that a variable rate bond with a non-increasing coupon rate may be treated similarly. It may also be appreciated that, as defined at block 506, bond LB will be non-increasing if LA is non-decreasing (and vice versa).

At block 702 two series of bonds $LA_1, \ldots, LA_N$ and $LB_1, \ldots, LB_N$ with corresponding principal amounts $PRNA_1, \ldots, PRNA_N$ and $PRNB_1, \ldots, PRNB_N$ are created by the Lower REMIC such that $PRNA_1 + \ldots + PRNA_N = PRN_A$ and $PRNB_1, \ldots, PRNB_N = PRN_B$. Principal is paid simultaneously to each of these bonds in proportion to their principal amounts. Currently, it may be assumed that $PRNA_k = PRN_A/N$ and $PRNB_k = PRN_B/N$ (for k=1, ..., N) but at times it may be necessary to apportion the principal among the lower REMIC bonds differently in order to satisfy various other REMIC requirements as discussed earlier.

As before, the value of $CPN_A(r)$ at the Index Rate points $R_1, R_2, \ldots, R_{N+1}$ is denoted by $V_1, \ldots, V_{N+1}$. Thus $V_1 = CPN_A(R_1), \ldots, V_{N+1} = CPN_A(R_{N+1})$. Since LA is non-decreasing this implies that $V_1 \leq V_2 \leq \ldots < V_N \leq V_{N+1}$.

At block 704 $CPNA_1(r)$ is defined as,
a) $CPNA_1(r) = (PRN_A/PRNA_1) \times V_1$ if $r < R_1$
b) $CPNA_1(r) = (PRN_A/PRNA_1) \times \{mA_1 \times r + bA_1\}$ if $R_1 < r \leq R_2$
c) $CPNA_1(r) = (PRN_A/PRNA_1) \times \{mA_1 \times R_2 + b_1\} = (PRN_A/PRNA_1) \times V_2$ if $r \geq R_2$ For k=2, ... N, $CPNA_k(r)$ is defined as,
a) $CPNA_k(r) = 0$ if $r < R_k$
b) $CPNA_k(r) = (PRN_A/PRNA_k) \times ([mA_k \times r + b_k] - V_k)$ if $R_k < r \leq R_{k+1}$
c) $CPNA_k(r) = (PRN_A/PRNA_k) \times (V_{k+1} - V_k)$ if $r \geq R_{k+1}$
where $mA_k$ and $b_k$ are as defined at block 506.

It may be noted that each of $LA_1, \ldots, LA_N$ are defined as single segment variable rate bonds subject to a minimum and maximum and therefore qualify as regular interests in a REMIC. Further, the amount of interest paid on bond $LA_1$ each period equals its coupon rate multiplied by its principal which equals a) $PRNA_1 \times CPNA_1(r) = PRNA_1 \times (PRN_A/PRNA_1) \times \{mA_1 \times r + bA_1\} = PRN_A \times \{mA_1 \times r + bA_1\}$, which equals the interest paid on the multisegment bond LA defined at block 506 if $R_1 < r \leq R_2$
b) $= PRN_A \times V_1$ if $r \leq R_1$
c) $= PRN_A \times V_2$ if $r > R_2$ The amount of interest paid on bonds $LA_k$ for k=2, ..., N equals
a) $PRNA_k \times CPNA_k(r) = PRNA_k \times (PRN_A/PRNA_k) \times (mA_k \times r + bA_k - V_k)$ if $R_k < r \leq R_{k+1}$
b) $= 0$ if $r < R_k$
c) $= PRN_A \times V_{k+1} - PRN_A \times V_k$ if $r > R_{k+1}$ Furthermore, for any value of the Index Rate r such that $R_k < r \leq R_{k+1}$ the sum total of all the interest paid on all the $LA_1, \ldots, LA_N$ bonds equals
INTEREST on $LA_1 = PRN_A \times V_2$
+INTEREST on $LA_2 = PRN_A \times V_3 - PRN_A \times V_2 \ldots$
+INTEREST on $LA_{k-1} = PRN_A \times V_k - PRN_A \times V_{k-1}$
+INTEREST on $LA_k = PRN_A \times \{mA_k \times r + bA_k\} - PRN_A \times V_k$
+INTEREST on $LA_{k+1} = 0 \ldots$
+INTEREST on $LA_N = 0$
TOTAL INTEREST $= PRN_A \times (mA_k \times r + bA_k)$
which is the amount of interest to be paid on bond LA as defined at block 506 of FIG. 5.

At block 706 the $LA_1, \ldots, LA_N$ bonds are placed into the second stage of the Lower REMIC as its collateral.

At block 708 bonds LA and LB are issued by the second stage of the Lower REMIC such that LA receives all the principal and all the interest on each of $LA_1, \ldots, LA_N$. Then by the above calculation the interest paid on bond LA equals, $$INT_A(r) = PRN_A \times \{mA_k \times r + bA_k\}$$

which equals the cashflow on $IO_A$ as determined at block 105.

It may be appreciated that the interest paid on bond LA is not derived by multiplying a principal amount by a coupon rate. In fact, LA does not have a coupon formula in the conventional sense. Rather it is defined as the sum of the interest portions on the $LA_1, \ldots, LA_N$ bonds. This qualifies it as a regular interest in a REMIC. Thus, although bond LA as ultimately created by the system does not have a conventional coupon formula, the amount of interest paid on LA is precisely equal the amount that would be derived by utilizing the formula defined at block 506.

In a similar manner the coupon formulas for bonds $LB_1, \ldots, LB_N$ are defined at block 704 such that the sum of the amounts of interest paid on $LB_1, \ldots, LB_N$ equals the amount specified for LB in block 506. Bond LB is created as a regular REMIC interest, The formulas for $CPNB_k(r)$ when k=1, ..., N-1 are,
a) $CPNB_k(r) = (PRN_B/PRNB_k) \times ([nB_k \times r + dBk] - W_{k+1})$ if $R_k < r \leq R_{k+1}$
b) $CPNB_k(r) = 0$ if $r \geq R_{k+1}$
c) $CPNB_k(r) = (PRN_B/PRNB_k) \times (W_k - W_{K+1})$ if $r < R_k$
where $nB_k$, $dB_k$ were defined at block 506 and $W_k = CPN_B(R_k)$.

For $CPNB_N(r)$ the formula is
a) $CPNB_N(r) = (PRN_B/PRNB_N) \times W_N$ if $r \leq R_N$
b) $CPNB_N(r) = (PRN_B/PRNB_N) \times (nB_N \times r + dB_N)$ if $R_N < r \leq R_{N+1}$
c) $CPNB_N(r) = W_{N+1}$ if $r > R_{N+1}$ At block 708 bond LB is issued such that it receives all principal and interest paid on bonds $LB_1, \ldots, LB_N$. Thus LB receives interest equal to the amount to be paid to $IO_B$ as provided at block 310. The system then proceeds to FIG. 8.

At block 802, the Upper REMIC is created and the bonds LA and LB issued by the Lower REMIC utilizing the procedure described in FIG. 6 or FIG. 7 are placed into the Upper REMIC as the collateral for the Upper REMIC.

At block 804, two securities are issued, $IO_A$ and $IO_B$; $IO_A$ will receive 100% of all the interest generated by LA and $IO_B$ will receive 100% of all the interest generated by LB. These securities will have interest only cash flows which equal the amounts specified by the Allocation Formula/Table at block 310.

At block 806, two other securities are created, $PRO_A$ and $PRO_B$. The same procedure is not applied to the creation of the $PRO_A$ and $PRO_B$ securities as for the $IO_A$ and $IO_B$ securities. The principal of the LA and LB bonds is not allocated between them in a manner that reflects the proposed $PRO_A$ and $PRO_B$ bonds. However, once the LA and LB bonds are placed into the Upper REMIC and their interest portions are stripped to create $IO_A$ and $IO_B$, their principal cash flows can be restructured and reallocated into the $PRO_A$ and $PRO_B$ securities (or into other securities) without resorting to a multistage REMIC. This is because REMIC regulations are less restrictive of how principal payments on the underlying securities may be distributed than of how interest payments on the underlying securities may be distributed. The total principal cash flows from LA and LB, which equals the total principal of the initial underlying securities is allocated to $PRO_A$ and $PRO_B$ as indicated in block 310 of FIG. 3.

At block 808 securities that are combinations of $PRO_A$, $PRO_B$, $IO_A$ and $IO_B$ may be created.

The securities certificates created in accordance with the invention and offered by an issuer/underwriter may be issued e.g., in minimum denominations of $1,000 and integral multiples of $1 in excess thereof in fully registered, certificated form. The securities certificates may also be maintained on the book-entry system of the Federal Reserve Banks in a manner that permits separate trading and ownership. Each class of securities certificates may be assigned a CUSIP number and may be tradable separately under such CUSIP number.

The securities certificates may be issued and guaranteed by the Federal National Mortgage Association ("Fannie Mae"). Fannie Mae's fiscal agent for the securities certificates may be, e.g., the Federal Reserve Bank of New York. The Federal Reserve Banks may issue the securities certificates in book-entry form and maintain book-entry accounts with respect to the securities certificates and make payment distributions on the securities certificates on behalf of Fannie Mae on the applicable distribution dates by crediting securities holder's accounts at the Federal Reserve Banks.

It may be appreciated that under such an arrangement the securities certificates may be held of record only by entities eligible to maintain book-entry accounts with the Federal Reserve Banks. Further, a securities holder may not necessarily be the beneficial owner of a securities certificate. Beneficial owners thus will ordinarily hold the securities certificates through one or more financial intermediates, such as banks, brokerage firms and securities clearing organizations. A securities holder that is not the beneficial owner of a securities certificate, and each other financial intermediary in the chain to the beneficial owner, will have the responsibility of establishing and maintaining accounts for their respective customers. The rights of the beneficial owner of a securities certificate with respect to Fannie Mae and the Federal Reserve Banks are therefore exercised only through the securities holder of such securities certificate.

EXAMPLE

An underwriter purchases $200 million of mortgage pools paying 9.0% interest for $210 million and can sell $100 million of the principal for $80 million. The underwriter wants to issue new securities to be collateralized by the future cashflows of the remaining $100 million of principal plus the interest payments at 9.0% on the $200 million of principal.

The detailed operation of the invention as it applies to this example may be understood by reference to FIGS. 3, 4, 5, 7 and 8.

At block 302 the parameters describing the underlying securities (the collateral) are input into the system. These include:

a) the principal amount of the underlying securities $PRN_C$=$200,000,000;

b) the coupon rate of the underlying securities $CPN_C$= 9%/year, payable monthly;

c) the remaining average maturity of the mortgages of 330 months; and d) anticipated mortgage prepayment scenarios of 12%, 24% and 36% annually (i.e., scenarios under which 12%, 24% and 36% of the remaining mortgage balance would be prepaid each year).

Throughout this example all calculation and formulas are presented on an annualized basis which is common industry practice. Thus the coupon rate is quoted as $CPN_C$=9%, but the actual interest payments occur monthly and equal the principal balance at the start of the month multiplied by one-twelfth the annual coupon rate.

At block 304 the system creates an array of cash flows that describe the behavior of the underlying securities under several prepayment scenarios.

At block 306 the system separates the cash flows produced at block 304 into two arrays; one that contains only the anticipated future principal payments on the underlying securities and one that contains only the anticipated interest payments on the underlying securities for each of the specified prepayment scenarios. Based on the initial cost, the principal-only portion is assigned a cost of $160 million (i.e., 80% of par value for $200 million principal) and the interest only portion is assigned a cost of $50 million (i.e., $50 million for 9% annual interest on $300 million of mortgage pools).

Some of the cash flow characteristics of the principal-only and interest-only portions of the underlying securities under the anticipated scenarios are shown in TABLE 2.

TABLE 2

| | Cash Flow Characteristics | | | |
|---|---|---|---|---|
| Prepayment Scenario: | 6% | 15% | 30% | 45% |
| Average Life of Principal | 10.75 yrs | 5.61 yrs | 2.75 yrs. | 1.83 yrs. |
| Total Amount of Interest | $261,160,000 | $168,300,000 | $116,800,000 | $100,260,000 |

Although $100 million of principal will ultimately be sold without being reallocated, the system proceeds as if all the principal is subject to allocation.

At block 308 the Allocation Formula/Table that determines how the cash flows will be allocated among the proposed new securities is specified. For this example, a) The Index Rate selected is the one-month Libor rate and is denoted by r;
b) Three values of the Index Rate are specified; $R_1=0.375\%$, $R_2=3.375\%$ $R_3=6.375\%$; and
c) The Principal Allocation Percentages and Interest Allocation Percentages for the given Index Rate points are specified in TABLE 3.

TABLE 3

Principal And Interest Allocation Percentages

| If Libor equals: | $R_1 = 0.375\%$ | $R_2 = 3.375\%$ | $R_2 = 6.375\%$ |
|---|---|---|---|
| Principal Allocation Percentage | $PPCTA_1 = 0.0\%$ | $PPCTA_2 = 66.667\%$ | $PPCTA_3 = 100\%$ |
| Interest Allocation Percentage | $IPCTA_1 = 0.0\%$ | $IPCTA_2 = 57\%$ | $IPCTA_3 = 100\%$ |

The values of the Principal Allocation Percentage and Interest Allocation Percentage for any given Index Rate value r are denoted by $PPCT_A(r)$ and $IPCT_A(r)$, respectively. The general formulations for $PPCT_A(r)$ and $IPCT_A(r)$ as derived from TABLE 3 by linear interpolation are shown in TABLE 4 where $IPCT_B(r)$ is defined to be $IPCT_B(r)=1-IPCT_A(r)$.

TABLE 4

Interest Allocation Formulas

| Index Rate Value | $IPCTA_A(r)$ | $IPCT_B(r) = 1\text{-}IPCT_A(r)$ |
|---|---|---|
| r < 0.375% | 0 | 1.0 |
| 0.375% < r < 3.375% | $m_1 \times r + b_1$ or | $n_1 \times r + d_1$ or |
| | $19 \times r - 0.07125$ | $1.07125 - 19 \times r$ |
| 3.375% < r < 6.375% | $m_2 \times r + b_2$ or | $n_2 \times r + d_2$ or |
| | $14.333 \times r + 0.08625$ | $0.91375 - 14.333 \times r$ |
| r > 6.375% | 1.0 | 0.0 |

At block 310 four arrays are created, one each for $PRO_A$, $PRO_B$, $IO_A$, and $IO_B$. Each month the principal payments generated by the underlying securities are allocated to $PRO_A$ amd $PRO_B$ only, and the interest payments are allocated to $IO_A$ and $IO_B$.

The principal amounts of $PRO_A$ and $PRO_B$ are $66 million and $134 million respectively. Each month the total principal payment generated by the underlying securities is allocated to $PRO_A$ and $PRO_B$ in proportion to their principal allocation percentages $PPCT_A(r)$ and $PPCT_B(r)$, respectively, where r is the value of the Index Rate applicable to that month. Neither $PRO_A$ nor $PRO_B$ may receive more than its stated amount of principal.

Each month the total interest amount generated by the underlying securities is allocated to $IO_A$ and $IO_B$ in proportion to their Principal Allocation Percentages $IPCT_A(r)$ and $IPCT_B(r)$, respectively, where r is the value of the Index Rate applicable to that month.

The total annual interest paid on the underlying securities equals the coupon rate ($CPN_C=9\%$ or $CPN_C=0.09$ in decimal form) multiplied by the principal balance of the underlying securities. Therefore, the amount of interest to be paid to $IO_A$ and $IO_B$ on an annual basis equals, $IO_A$ interest=$PRN_C \times CPN_C \times IPCT_A(r)=PRN_C \times 0.09 \times IPCT_A(r)$ $IO_B$ interest=$PRN_C \times CPN_C \times IPCT_B(r)=PRN_C \times 0.09 \times IPCT_B(r)$ where r is the applicable value of the Index Rate.

The amounts that would be paid $IO_A$ and $IO_B$ for selected values of the Index Rate are calculated and shown in TABLE 5. In each case $PRN_C$ represents the remaining principal balance of the underlying securities for the applicable period. The amounts shown are on an annual basis.

TABLE 5

Interest Payments for $IO_A$ And $IO_B$

| Index Rate Value | Interest on $IO_A$ = $PRN_C \times 0.09 \times IPCT_A(r)$ | Interest on $IO_B$ = $PRN_C \times 0.09 \times IPCT_B(r)$ |
|---|---|---|
| r = 0.0% | 0 | $0.09 \times PRN_c$ |
| r = 2% | $0.027875 \times PRN_c$ | $0.0622125 \times PRN_c$ |

TABLE 5-continued

Interest Payments for $IO_A$ And $IO_B$

| Index Rate Value | Interest on $IO_A$ = $PRN_C \times 0.09 \times IPCT_A(r)$ | Interest on $IO_B$ = $PRN_C \times 0.09 \times IPCT_B(r)$ |
|---|---|---|
| r = 5% | $0.0722625 \times PRN_c$ | $0.0177375 \times PRN_c$ |
| r = 7% | $0.09 \times PRN_c$ | 0.0 |

At block 312 two combination securities are created. One is a "bullish" security designed to perform well if the index rate remains low and consists of half the cash flows of $PRO_A$ plus all of the cash flows of $IO_A$. The other combination security consists of half the cash flows (i.e., $67 million of principal) of $PRO_B$ and all of the cash flows of $IO_B$. (The remaining halves of $PRO_A$ and $PRO_B$ will be combined and sold in original form as $100 million of principal-only securities as noted above.)

From block 312 the system proceeds to FIG. 4 where various prices for the new securities are analyzed at blocks 402 thru 416 until it is determined that the bullish combination security can be sold for approximately $32 million and the bearish security for $101 million. Since the remaining $100 of principal-only securities can be sold for $80 million, total proceeds would be approximately $213 million and the deal is viable with the cost of the collateral at $210 million before expenses.

TABLES 6 and 7 below show the a) yield, b) average life of principal and c) total cash flow for the combination securities for several Index Rate and prepayment scenarios.

TABLE 6

Bullish Combination At $32,233,000

| | Prepayment Scenarios (%/Yr.) | | | |
|---|---|---|---|---|
| Index Rate | 6% | 15% | 30% | 42% |
| 2.375% | 45% | 53% | 63% | 69% |
| | 5.3 yrs. | 2.3 yrs. | 1.2 yrs. | 0.8 yrs. |
| | $153.1 mm | $95.5 mm | $63.6 mm | $53.3 mm |
| 3.375% | 27% | 28% | 30% | 31% |
| | 10.6 yrs. | 5.4 yrs. | 2.6 yrs. | 1.7 yrs. |

TABLE 6-continued

Bullish Combination At $32,233,000

Prepayment Scenarios (%/Yr.)

| Index Rate | 6% | 15% | 30% | 42% |
|---|---|---|---|---|
|  | $116.5 mm | $76.6 mm | $54.4 mm | $47.3 mm |
| 5.375% | 6% | 5.6% | 6.0% | 6.8% |
|  | 18.0 yrs. | 10.5 yrs. | 5.2 yrs. | 3.4 yrs. |
|  | $61.3 mm | $47.9 mm | $40.6 mm | $38.2 mm |

TABLE 7

Bearish Combination At $101,227,000

Prepayment Scenarios (%/Yr.)

| Index Rate | 6% | 15% | 30% | 42% |
|---|---|---|---|---|
| 2.375% | 3.4% | 0.6% | −4.6% | −9.5% |
|  | 13.4 yrs. | 7.2 yrs. | 3.5 yrs. | 2.4 yrs. |
|  | $141,1 mm | $105.8 mm | $86.2 mm | $79.9 mm |
| 3.375% | 7.5% | 4.5% | −2.1% | −7.9% |
|  | 10.85 yrs. | 5.7 yrs. | 2.8 yrs. | 1.9 yrs. |
|  | $177.7 mm | $124.7 mm | $95.4 mm | $86.0 mm |
| 5.375% | 14.4% | 11.8% | 4.0% | −47% |
|  | 7.2 yrs. | 3.2 yrs. | 1.5 yrs. | 1.0 yrs. |
|  | $232.9 mm | $153.4 mm | $109.2 mm | $95.1 mm |

It may be appreciated that since the total cash received by the bullish combination always exceeds its cost of $32,233,000, its yield is always postive. The cash flow of the bearish combination, however, may be less than its $101 million cost under some scenarios and, therefore, may have a negative return. The negative return, however, is limited because its cash flow must be at least equal to its $67 million principal amount. Traditional bearish instruments such as interest-only bonds may have much greater risk because they have no principal amount and, therefore, are guaranteed no minimum cash flow.

Having determined that proposed securities warrant issuance, the system proceeds to FIG. 5 for the actual issuance process.

In FIG. 5 the system proceeds to issue two bonds, LA and LB, such that the interest paid on them equals the intended cashflows of $IO_A$ and $IO_B$, respectively.

At block 502 a REMIC with a Lower and Upper stage is created; the Lower REMIC itself also has first and second stages. The underlying securities are placed into the first stage of the Lower REMIC as its collateral; $PRN_C=\$200$ million and $CPN_C=9\%$. Bond LA is issued with principal $PRN_A=\%100$ million and coupon formula, $$CPN_A(r)=[PRN_C/PRN_A]\times CPN_C \times IPCT_A(r) = [200/100]\times 0.09 \times IPCT_A(r)$$

Bond LB is issued with principal $PRN_B=\$100$ million and coupon formula, $$CPN_B(r)=[PRN_C/PRN_B]\times CPN_C \times IPCT_B(r) = [200/100]\times 0.09 \times IPCT_B(r)$$

where r is the applicable value of the Index Rate.

Using the formulas for $IPCT_B(r)$ and $IPCT_B(r)$ as shown in TABLE 5, the formulas for $CPN_A(r)$ and $CPN_B(r)$ are calculated as shown in TABLE 8.

The values of $CPN_A(r)$ and $CPN_B(r)$ at the points $R_1=0.375\%$, $R_2=3.375\%$, $R_3=6.375\%$ are denoted by $V_1$, $V_2$, $V_3$, $W_1$, $W_2$ and $W_3$ and are also calculated and shown TABLE 8.

TABLE 8

Coupon Formulas For LA and LB

| Index Rate Value = | $CPN_A(r) = 0.18 \times IPCT_A(r)$ | $CPN_B(r) = 0.18 \times IPCT_B(r)$ |
|---|---|---|
| $r < r_1 = 0.375$ | $V_1 = 0.0$ | $W_1 = 0.36$ |
| $0.375\% < r \leq 3.375\%$ | $mA_1 \times r + bA_1$ | $nB_1 \times r + dB_1$ |
|  | $3.42 \times 4 - .012825$ | $-3.42 \times r + 0.192825$ |
| $r = R_2 = 3.375\%$ | $V_2 = 0.1026$ | $W_2 = 0.0774$ |
| $3.375\% < r \leq 6.375\%$ | $mA_2 \times r + bA_2$ | $nB_2 \times r + dB_2$ |
|  | $2.58 \times r + 0.015525$ | $-2.58 \times r + 0.164475$ |
| $r > R_3 = 6.375\%$ | $V_3 = 0.18$ | $W_3 = 0.0$ |

At block 508 $CPN_A(r)$ and $CPN_B(r)$ are examined. It is determined that $CPN_A(r)$ can only increase and $CPN_B(r)$ can only decrease as the value of the Index Rate r increases. Therefore, LA and LB are unidirectional multisegment variable rate bonds and the data processing system proceeds to FIG. 7.

At block 702, bonds $LA_1$, $LA_2$, $LB_1$, and $LB_2$ are issued in the first stage of the lower REMIC such that, $$PRNA_1=PRNA_2=(PRN_A)/2=PRN_C/4=\$50,000,000$$

$$PRNB_1=PRNB_2=(PRN_B)/2=PRN_C/4=\$50,000,000$$

The principal generated by the underlying securities is paid simultaneously to $LA_1$, $LA_2$, $LB_1$, and $LB_2$, in proportion to their principal amounts.

At block 704 $CPNA_1(r)$, $CPNA_2(r)$, $CPNB_1(r)$ and $CPNB_B(r)$ are defined as, $$CPNA_1(r)=(PRN_A/PRNA_1)\times(mA_1\times r+bA_1) \text{ for } 0.375\%<r<3.375\%$$

$$CPNA_2(r)=(PRN_A/PRNA_2)\times(mA_2\times r+bA_2-V_2) \text{ for } 3.375\%<r<6.375\%$$

$$CPNB_1(r)=(PRN_B/PRNA_1)\times(nB_1\times r+dB_1-W_2) \text{ for } 0.375\%<r<3.375\%$$

$$CPNB_2(r)=(PRN_B/PRNA_2)\times(nB_2\times r+dB_2) \text{ for } 3.375\%<r<6.375\%$$

where $mA_1$, $mA_2$, $bA_1$, $bA_2$, $nB_1$, $nB_2$, $dB_1$, $dB_2$, $V_1$, $V_2$, $W_1$, $W_2$ are as calculated above at block 506.

TABLE 9

Coupon Formula For $LA_1$, $LA_2$, $LB_1$ And $LB_2$

| Index Rate Value | $CPNA_1(r)$ | $CPNA_2(r)$ | $CPNB_1(r)$ | $CPNB_2(r)$ |
|---|---|---|---|---|
| $r < R_1 = 0.375\%$ | 0.0 | 0.0 | 0.2052 | 0.1548 |
| $0.375\% < r \leq 3.375\%$ | $6.84 \times r - 0.02525$ | 0.0 | $6.34 \times r + 0.23085$ | 0.1548 |
| $r = R_2 = 3.375\%$ | 0.2052 | 0.0 | 0.0 | 0.1548 |
| $3.375\% < r \leq 6.375\%$ | 0.2052 | $5.16 \times r - 0.17415$ | 0.0 | $-5.16 \times r + 0.32895$ |
| $r \geq R_2 = 6.375\%$ | 0.2052 | 0.1548 | 0.0 | 0.0 |

The interest paid on $LA_1$, $LA_2$, $LB_1$ and $LB_2$ is calculated for several values of the Index Rate as shown in TABLE 10.

TABLE 10

Interest Paid on $LA_1$, $LA_2$, $LB_1$ And $LB_2$.

| Index Rate Value | $INTA_1(r)$ | $INTA_2(r)$ | $INTB_1(r)$ | $INTB_2(r)$ |
|---|---|---|---|---|
| r = 0% | 0.0 | 0.0 | 0.0573 | 0.03875 × $PRN_c$ |
| r = 2% | 0.027875 × $PRN_c$ | 0.0 | 0.0235125 × $PRN_c$ | 0.03875 × $PRN_c$ |
| r = 5% | 0.0513 × $PRN_c$ | 0.0209625 × $PRN_c$ | 0.0 | 0.0177375 × $PRN_c$ |
| r = 7% | 0.0513 × $PRN_c$ | 0.0387 × $PRN_c$ | 0.0 | 0.0 |

At block 706 bonds $LA_1$, $LA_2$, $LB_1$ and $LB_2$ are placed into the second stage of the Lower REMIC to serve as its collateral.

At block 708 bonds LA and LB are issued by the second stage of the Lower REMIC. LA will receive all the principal and all the interest paid on $LA_1$ and $LA_2$. LB will receive all of the principal and all of the interest paid on $LB_1$ and $LB_2$.

Upon examination of TABLE 10, it may be seen that the total interest paid on $LA_1$ and $LA_2$ equals the interest payments for $IO_A$ derived at block 310 and shown in TABLE 5 and the total interest paid on $LB_1$ and $LB_2$ equals the interest payments for $IO_B$.

The system proceeds to FIG. 8 where LA and LB are placed into the upper REMIC at block 802. At block 804 and 806, $PRO_A$, $PRO_B$, $IO_A$ and $IO_B$ are issued as specified at block 310. At block 808, $IO_A$ is combined with half of $PRO_A$ to form the bullish combination security and $IO_B$ is combined with half of $PRO_B$ to form the bearish combination security. The remaining halves of $PRO_A$ and $PRO_B$ are combined and sold as the original principal-only bond.

It may be appreciated that ultimately the upper REMIC issues only three regular REMIC securities. Namely a) the $100 million principal-only bond, b) the bullish security with $33 million principal and c) the bearish security with $67 million principal. If the $PRO_A$, $PRO_B$, $IO_A$ and $IO_B$ will not be sold separately, the combination securities may be issued directly without first issuing and then combining the $PRO_A$, $PRO_B$, $IO_A$ and $IO_B$ securities.

While the invention has been described in its preferred embodiments, it is to be understood that the words which have been used are words of description, rather than limitation, and that changes may be made within the purview of the appended claims without departing from the true scope and spirit of the invention in its broader aspects.

What is claimed:

1. An apparatus for creating new securities from underlying securities collateralized by mortgage obligations, comprising:

means for creating a plurality of first securities collateralized by the underlying securities and having total principal payments equal to an allocated amount of the principal payments from the underlying securities based upon a preselected interest rate and total interest payments equal to total payments of a first interest-only security;

means for creating a plurality of second securities collateralized by the underlying securities and having total principal payments equal to a remainder of the principal payments from the underlying securities and total interest payments equal to the interest payments on a second interest-only security;

means for creating said first interest-only security collateralized by said plurality of first securities and having payments equal to the total interest payments from said plurality of first securities;

means for creating said second interest-only security collateralized by said plurality of second securities and having payments equal to the total interest payments from said plurality of second securities; and means for printing at least one securities document for the new securities;

wherein an interest rate on each of said first and second securities varies linearly subject to a minimum and a maximum.

2. An apparatus according to claim 1, further comprising means for creating at least one principal-only security collateralized by said plurality of first securities and said plurality of second securities and having total payments equal to the total principal payments from said plurality of first securities and said plurality of second securities.

3. An apparatus according to claim 1, wherein principal payments from the underlying securities are allocated equally among said first and second securities.

4. An apparatus according to claim 1, wherein principal payments from the underlying securities are allocated unequally among said first and second securities.

5. An apparatus according to claim 3 or 4, wherein principal payments from the underlying securities are distributed to each of said first and second securities in proportion to a stated principal amount.

6. An apparatus according to claim 1, wherein each of said first and second securities is a single segment variable rate security.

7. An apparatus according to claim 1, wherein said first and second interest-only securities are monotonic variable rate securities.

8. An apparatus according to claim 2, further comprising means for combining at least two of said first and second interest-only securities and said first and second principal-only securities into a combination security.

9. An apparatus according to claim 8, wherein said combination security increases in value as interest rates decline.

10. An apparatus according to claim 8, wherein said combination security increases in value as interest rates rise.

11. An apparatus for creating new securities from underlying securities collateralized by mortgage obligations, comprising:

means for creating a plurality of first securities collateralized by the underlying securities and having total principal payments equal to an allocated amount of the principal payments from the underlying securities based upon a preselected interest rate and total interest payments equal to total payments of a first interest-only security;

means for creating a plurality of second securities collateralized by the underlying securities and having total principal payments equal to a remainder of the principal payments from the underlying securities and total interest payments equal to the interest payments on a second interest-only security;

means for creating a third security collateralized by said plurality of first securities and having principal payments equal to an allocated amount of the principal payments from the underlying securities and interest payments equal to the total interest payments from said plurality of first securities;

means for creating a fourth security collateralized by said plurality of second securities and principal payments equal to a remainder of the principal payments from the underlying securities and interest payments equal to the total interest payments from said plurality of second securities; and means for creating said first interest-only security collateralized by said third security and having payments equal to the interest payments from said third security;

means for creating said second interest-only security collateralized by said fourth security and having payments equal to the interest payments from said fourth security;

means for printing at least one securities document for the new securities;

wherein an interest rate on each of said first and second securities varies linearly subject to a minimum and a maximum.

12. An apparatus according to claim 11, further comprising means for creating at least one principal-only security collateralized by said third and fourth securities and having total payments equal to the total principal payments from said third and fourth securities.

13. An apparatus according to claim 11, wherein principal payments from the underlying securities are allocated equally among said first and second securities.

14. An apparatus according to claim 11, wherein principal payments from the underlying securities are allocated unequally among said first and second securities.

15. An apparatus according to claim 13 or 14, wherein principal payments from the underlying securities are distributed to each of said first and second securities in proportion to a stated principal amount.

16. An apparatus according to claim 11, wherein each of said first and second securities is a single segment variable rate security.

17. An apparatus according to claim 11, wherein said first and second interest-only securities are monotonic variable rate securities.

18. An apparatus according to claim 12, further comprising means for combining at least two of said first and second interest-only securities and said first and second principal-only securities into a combination security.

19. An apparatus according to claim 18, wherein said combination security increases in value as interest rates decline.

20. An apparatus according to claim 18, wherein said combination security increases in value as interest rates rise.

21. A method for creating new securities from underlying securities collateralized by mortgage obligations, comprising the steps of:

creating a plurality of first securities collateralized by the underlying securities and having total principal payments equal to an allocated amount of the principal payments from the underlying securities based upon a preselected interest rate and total interest payments equal to total payments of a first interest-only security;

creating a plurality of second securities collateralized by the underlying securities and having total principal payments equal to a remainder of the principal payments from the underlying securities and total interest payments equal to the interest payments on a second interest-only security;

setting an interest rate on each of said first and second securities to vary linearly subject to a minimum and a maximum;

creating said first interest-only security collateralized by said plurality of first securities and having payments equal to the total interest payments from said plurality of first securities;

creating said second interest-only security collateralized by said plurality of second securities and having payments equal to the total interest payments from said plurality of second securities; and printing at least one securities document for the new securities.

22. A method according to claim 21, further comprising the step of creating at least one principal-only security collateralized by said plurality of first securities and said plurality of second securities and having total payments equal to the total principal payments from said plurality of first securities and said plurality of second securities.

23. A method according to claim 21, further comprising the step of allocating principal payments from the underlying securities equally among said first and second securities.

24. A method according to claim 21, further comprising the step of allocating principal payments from the underlying securities unequally among said first and second securities.

25. A method according to claim 23 or 24, further comprising the step of distributing principal payments from the underlying securities to each of said first and second securities in proportion to a stated principal amount.

26. A method according to claim 21, further comprising the step of combining at least two of said first and second interest-only securities and said first and second principal-only securities into a combination security.

27. A method according to claim 26, further comprising the step of designing said combination security to increase in value as interest rates decline.

28. A method according to claim 26, further comprising the step of designing said combination security to increase in value as interest rates rise.

29. An apparatus for creating new securities from underlying securities collateralized by mortgage obligations, comprising:

a memory for recallably storing information;

a keyboard for entering information to be stored in said memory describing the underlying securities and the new securities to be created;

a processing unit utilizing the information stored in said memory for:

(i) defining a plurality of first securities collateralized by the underlying securities and having total principal payments equal to an allocated amount of the principal payments from the underlying securities based upon a preselected interest rate and total interest payments equal to total payments of a first interest-only security, wherein an interest rate on each of said first securities varies linearly subject to a minimum and a maximum;

(ii) defining a plurality of second securities collateralized by the underlying securities and having total principal payments equal to a remainder of the principal payments from the underlying securities and total interest payments equal to the interest payments on a second interest-only security, wherein an interest rate on each of said second securities varies; linearly subject to a minimum and a maximum;

(iii) defining said first interest-only security collateralized by said plurality of first securities and having payments equal to the total interest payments from said plurality of first securities; and (iv) defining said second interest-only security collateralized by said plurality of second securities and having payments equal to the total interest payments from said plurality of second securities;

a display for displaying information on each of the securities defined by said processor; and a printer for printing at least one securities document for the new securities.

30. An apparatus according to claim 29, wherein said processor utilizes the information stored in said memory for defining at least one principal-only security collateralized by said plurality of first securities and said plurality of second securities and having total payments equal to the total principal payments from said plurality of first securities and said plurality of second securities.

31. An apparatus according to claim 29, further comprising means associated with said keyboard to allow interactive access to the apparatus by a user.

32. An apparatus according to claim 31, further comprising means associated with said keyboard for allowing the user to alter information on either the underlying securities or the new securities.

33. An apparatus according to claim 29, further comprising a printer for printing reports on securities defined by said processor.

34. An apparatus according to claim 29, further comprising a printer for printing drafts of securities to be issued.

35. An apparatus according to claim 29, further comprising a printer for printing payment checks to holders of issued securities.

36. An apparatus according to claim 29, further comprising means associated with said display for displaying structure and financial performance of the new securities.

37. An apparatus according to claim 29, further comprising means associated with said display for displaying a distibution of cash flows to the new securities.

38. An apparatus according to claim 29, further comprising means associated with said display for displaying timing on cash flows to security holders under a plurality of interest rate and prepayment conditions.

* * * * *